(12) United States Patent
Tanaka et al.

(10) Patent No.: US 6,474,099 B2
(45) Date of Patent: Nov. 5, 2002

(54) ADSORPTION-TYPE COOLING APPARATUS

(75) Inventors: Masaaki Tanaka, Nagoya (JP); Satoshi Inoue, Kariya (JP); Hideaki Sato, Anjo (JP); Katsuya Ishii, Anjo (JP); Hisao Nagashima, Okazaki (JP); Shin Honda, Nagoya (JP); Takahisa Suzuki, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/734,845

(22) Filed: Dec. 11, 2000

(65) Prior Publication Data
US 2002/0035849 A1 Mar. 28, 2002

(30) Foreign Application Priority Data

Dec. 17, 1999 (JP) .............................. 11-359761
Feb. 28, 2000 (JP) ........................ 2000-056055

(51) Int. Cl.$^7$ ............................................... F25B 17/08
(52) U.S. Cl. ........................................... 62/480; 62/476
(58) Field of Search ........................ 62/480, 481, 476, 62/477, 335, 101, 106

(56) References Cited
U.S. PATENT DOCUMENTS 5,157,938 A * 10/1992 Bard et al. ................... 62/335
5,351,493 A * 10/1994 Hiro et al. ................... 62/46.2
5,463,879 A * 11/1995 Jones ........................... 62/480
5,775,126 A 7/1998 Sato et al.

\* cited by examiner

Primary Examiner—Denise Esquivel
Assistant Examiner—Melvin Jones
(74) Attorney, Agent, or Firm—Harness, Dickey & Pierce, PLC

(57) ABSTRACT

The present invention provides an adsorption-type cooling apparatus comprising first, second, third, and fourth adsorption devices filled with a coolant and contain adsorbents which adsorb evaporated coolant and desorb the adsorbed coolant during heating. Adsorption cores provide heat exchange between the adsorbents and a heat medium, and evaporation and condensation cores provide heat exchange between heating medium and the coolant. A cooling device in which heating medium cooled in the evaporation and condensation cores circulates and cools the object of cooling. A heating means supplies a high-temperature heat medium to the first–fourth adsorption devices. A cooling means supplies a low-temperature heat medium which has a temperature lower than that of the high-temperature heat medium to the first–fourth adsorption devices. Also, a switching control means is provided which switches between multiple states.

6 Claims, 22 Drawing Sheets

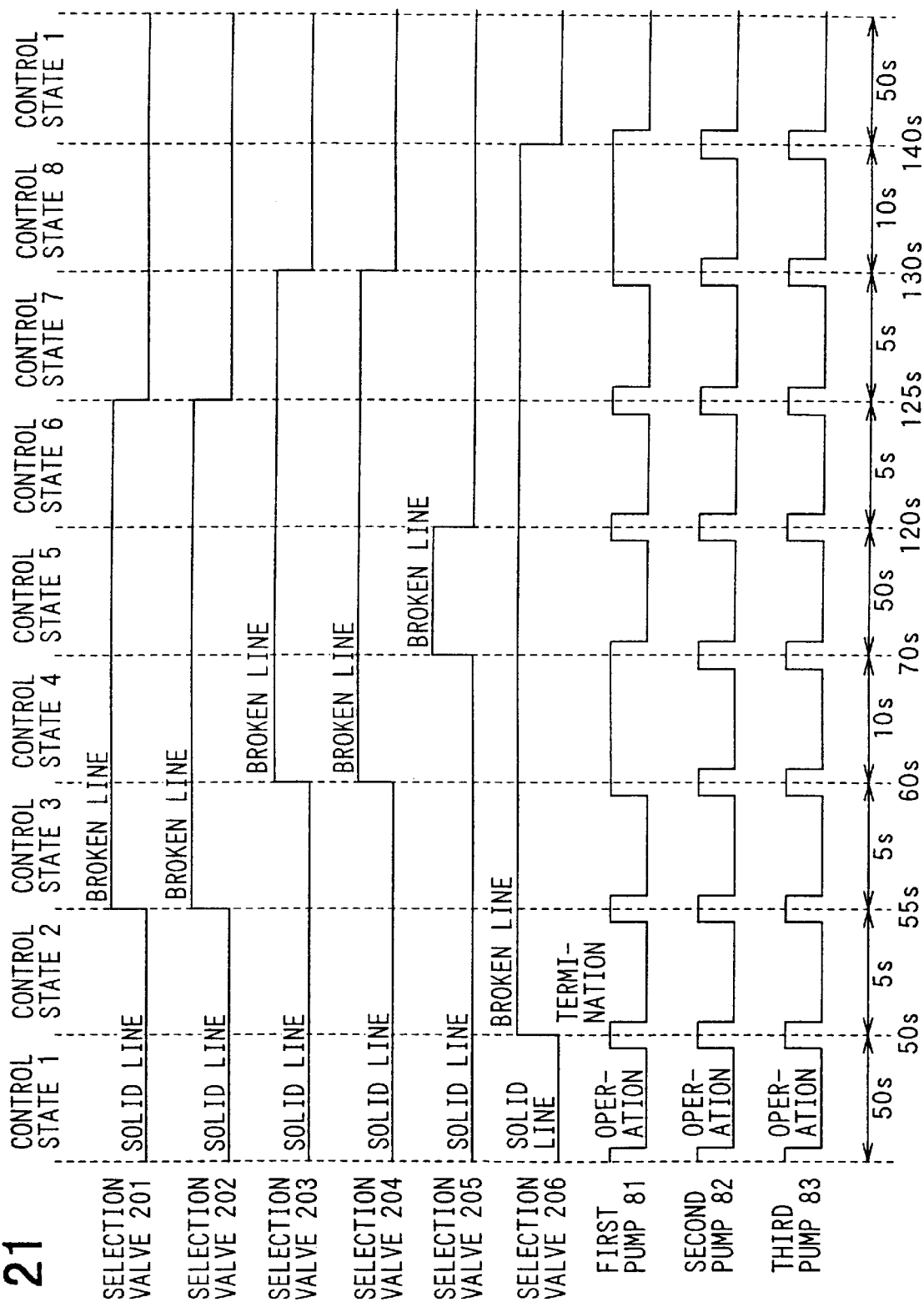

ADSORPTION-TYPE COOLING APPARATUS

CROSS REFERENCE TO RELATED ART

The present invention is related to Japanese patent application No. Hei. 11-359761, filed Dec. 17, 1999; 2000-56055, filed Feb. 28, 2000; the contents of which are incorporated herein by reference.

FIELD OF THE INVENTION

The present invention relates to an adsorption-type cooling apparatus, and more particularly to an adsorption-type cooling apparatus that is suitable for application to air conditioners.

BACKGROUND OF THE INVENTION

The assignee has filed an application relating to an adsorption-type cooling apparatus containing at least four adsorption devices (Laid-open Japanese Patent Application 9-303900 hereby incorporated by reference). However, in the above-mentioned openly described invention, the apparatus is difficult to control.

SUMMARY OF THE INVENTION

In view of the above, the present invention provides an adsorption-type cooling apparatus containing four adsorption devices. The present invention provides an adsorption-type cooling apparatus comprising first, second, third, and fourth adsorption devices. These devices are filled with a coolant and contain adsorbents which adsorb evaporated coolant and desorb the adsorbed coolant during heating. Adsorption cores provide heat exchange between the adsorbents and a heat medium, and evaporation and condensation cores provide heat exchange between heating medium and the coolant. A cooling device in which heating medium cooled in the evaporation and condensation cores circulates and cools the object of cooling. A heating means supplies a high-temperature heat medium to the first–fourth adsorption devices. A cooling means supplies a low-temperature heat medium which has a temperature lower than that of the high-temperature heat medium to the first–fourth adsorption devices. Also, a switching control means is provided which switches between multiple states. In a first state, a heat medium is circulated between the cooling device and evaporation and condensation cores of the first and second adsorption devices. The low-temperature heat medium is circulated to the adsorption core of the first adsorption device and heating medium exiting the cooling device is circulated to the adsorption core of the second adsorption device. Meanwhile, the high-temperature heat medium is circulated to the adsorption cores of the third and fourth adsorption devices and the low-temperature heat medium is circulated to the evaporation and condensation cores of the third and fourth adsorption devices. In a second state, a heat medium is circulated between the cooling device and evaporation and condensation cores of the first and second adsorption devices and the low-temperature heat medium is circulated to the adsorption cores of the first and second adsorption devices. Meanwhile the high-temperature heat medium is circulated to the adsorption cores of the third and fourth adsorption devices and the low-temperature heat medium is circulated to the evaporation and condensation cores of the third and fourth adsorption devices. In a third state, the low-temperature heat medium is supplied to the inlet openings of evaporation and condensation cores of the first and second adsorption devices and the high-temperature heat medium is supplied to inlet openings of the adsorption cores of the first and second adsorption devices. Meanwhile, the low-temperature heat medium is supplied to the inlet openings of the adsorption cores of the third and fourth adsorption devices and heating medium exiting the cooling device is supplied to the evaporation and condensation cores of the third and fourth adsorption devices. In a fourth state, the low-temperature heat medium is circulated to the evaporation and condensation cores of the first and second adsorption devices and the high-temperature heat medium is circulated to the adsorption cores of the first and second adsorption devices. Meanwhile, the low-temperature heat medium is circulated to the adsorption cores of the third and fourth adsorption devices and when the evaporation and condensation cores of the third and fourth adsorption devices were filled with heating medium that exited the cooling device, the circulation of this heat medium is terminated. In a fifth state, a heat medium is circulated between the cooling device and evaporation and condensation cores of the third and fourth adsorption devices, the low-temperature heat medium is circulated to the adsorption core of the third adsorption device, and heating medium exiting the cooling device is circulated to the adsorption core of the fourth adsorption device. Meanwhile, the high-temperature heat medium is circulated to the adsorption cores of the first and second adsorption devices and the low-temperature heat medium is circulated to the evaporation and condensation cores of the first and second adsorption devices. In a sixth state (VI), a heat medium is circulated between the cooling device and evaporation and condensation cores of the third and fourth adsorption devices and the low-temperature heat medium is circulated to the adsorption cores of the third and fourth adsorption device. Meanwhile, the high-temperature heat medium is circulated to the adsorption cores of the first and second adsorption devices and the low-temperature heat medium is circulated to the evaporation and condensation cores of the first and second adsorption devices. In a seventh state (VII), the low-temperature heat medium is supplied to evaporation and condensation cores of the third and fourth adsorption devices and the high-temperature heat medium is supplied to the inlet openings of adsorption cores of the third and fourth adsorption device. Meanwhile, low-temperature heat medium is supplied to the inlet openings of the adsorption cores of the first and second adsorption devices and heating medium exiting the cooling device is supplied to the evaporation and condensation cores of the first and second adsorption devices. In an eighth state (VIII), the low-temperature heat medium is circulated to the evaporation and condensation cores of the third and fourth adsorption devices and the high-temperature heat medium is circulated to the adsorption cores of the third and fourth adsorption device. Meanwhile, the low-temperature heat medium is circulated to the adsorption cores of the first and second adsorption devices and when the evaporation and condensation cores of the first and second adsorption devices were filled with heating medium, exiting the cooling device, circulation of this heat medium is terminated. Accordingly, the switching control means has a first switching control pattern in which the states are switched in the following order: first state (I)→second state (II)→third state (III)→fourth state (IV)→fifth state (V)→sixth state (VI)→seventh state (VII)→eighth state (VIII)→first state (I).

As a result, heating medium flowing out of the cooling device which was cooling the adsorption cores in the first and fifth states is supplied to the evaporation and condensation cores undergoing the adsorption process, without being supplied to the adsorption cores, in the second and sixth states. For this reason, the supply of heating medium that has been heated while cooling the adsorption cores to the evaporation and condensation cores undergoing the adsorption process in the next stage can be prevented. Therefore, heating of the evaporation and condensation cores undergoing the adsorption process in the next stage can be prevented in advance. As a result, it is possible to prevent the loss of cooling capacity of the adsorption-type cooling apparatus. Also, the outflow temperature fluctuation is reduced by two-stage adsorption devices. Moreover, water hammering is prevented by switching valves.

In another aspect, the switching control means has a second switching control pattern in which the states are switched in the following order: fourth state (IV)→seventh state (VII)→eighth state (VIII)→third state (III)→fourth state (IV).

As a result, if the second control pattern is implemented when a large cooling capacity is required, the cooling capacity of two adsorption devices can be taken out of the cooling device and the coefficient of performance of the adsorption-type cooling apparatus can be increased.

In another aspect, the switching control means switches the states in the following order: first state (I)→third state (III)→fourth state (IV)→fifth state (V)→seventh state (VII)→eighth state (VIII)→first state (I), when the operation time of said first and fifth states (I, V) is extended.

As a result, if the first and fifth states are extended, the caloric value of adsorbents located inside the adsorption devices is decreased. For this reason, the transition from the first state to the fifth state or the transition from the fifth state to the first state can be rapidly conducted. without implementing the second and sixth states. Therefore, the time period in which the adsorption-type cooling apparatus demonstrates cooling capacity can be extended which increases the efficiency of the adsorption-type cooling apparatus.

In another aspect, the flow rate of heating medium supplied to the evaporation and condensation cores in the third state (III) or seventh state (VII) is greater than the flow rate of heating medium supplied to the evaporation and condensation cores in the first state (I) or fifth state (V).

As a result, the operation time of the third state (III) or seventh state (VII) can be shortened. Therefore, the time period during which the adsorption-type cooling apparatus demonstrates cooling capacity can be extended, and the cooling efficiency and coefficient of performance of the adsorption-type cooling apparatus can be increased.

In another aspect, the switching control means controls heating medium flow by controlling the valves switching heating medium and flow pumps circulating heating medium flow. When the valves are switched, the switching control means controls the pumps to terminate the circulation of heating medium to the switched valves. As a result, the action of a large force created by water impact (water hammer) on valves when the valves are switched is prevented.

In another aspect, a check valve is installed inside heating medium channel through which heating medium flows, in a position in which heating medium flows in one direction only. As a result, the backward flow of heating medium that was pushed in by the pump pressure can be prevented even when the pumps are stopped. Therefore, the replacement of heat medium can be conducted quickly and accurately and the adsorption-type cooling apparatus can demonstrate its capacity in full.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description. Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description. In the drawings:

BRIEF DESCRIPTION OF THE DRAWINGS

The present invention will become more fully understood from the detailed description and the accompanying drawings, wherein:

FIG. 21 is a graphical view showing the operation of the selector valves and pumps of the adsorption-type cooling apparatus of Embodiment 7 of the present invention;

Figure 1:
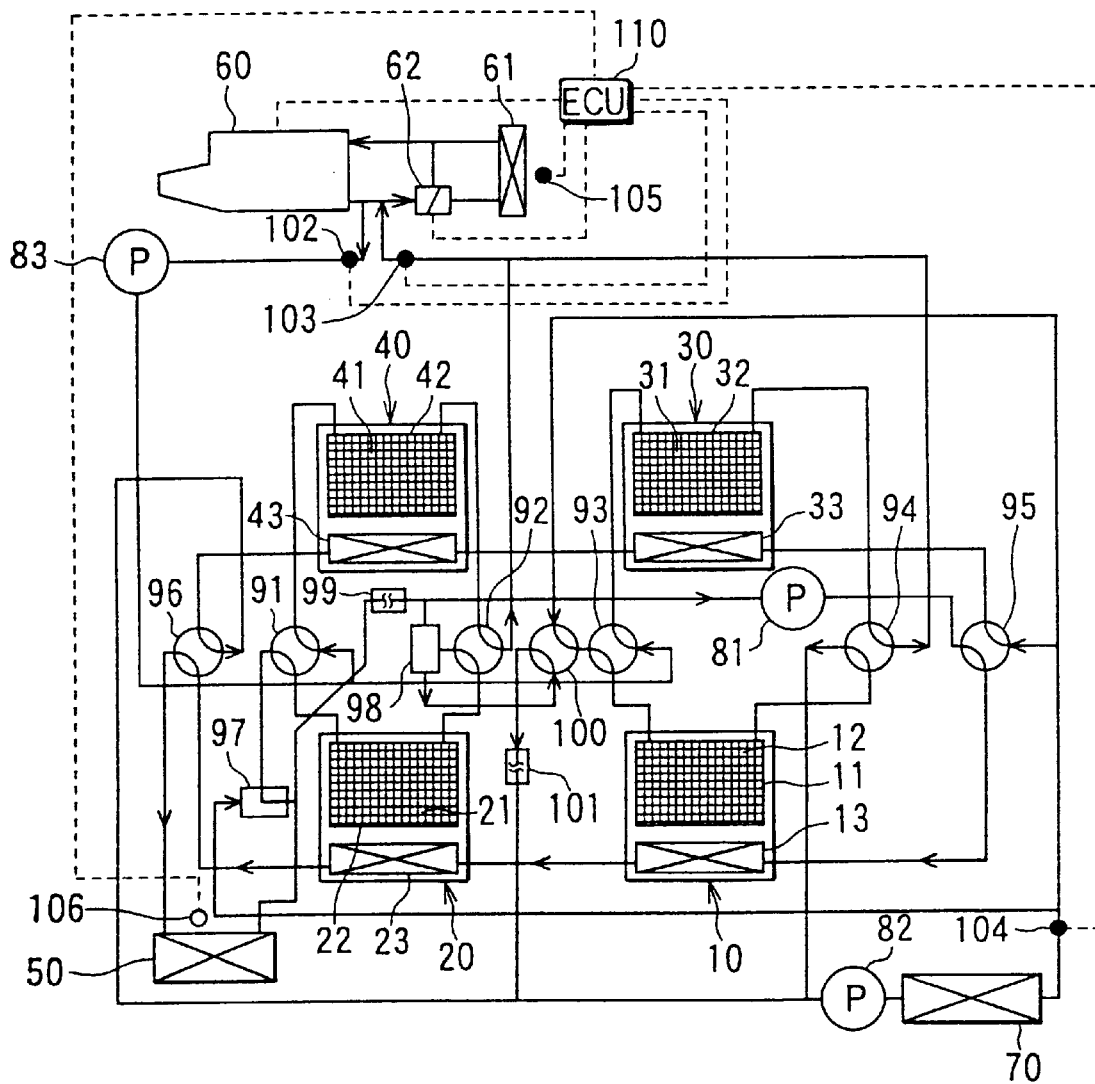
FIG. 1 is a schematic view of the adsorption-type cooling apparatus of a first embodiment of the present invention.

In a first embodiment, as shown in FIG. 1, the adsorption-type cooling apparatus is applied to an air conditioner for vehicles. In this figure, reference symbols 10, 20, 30, 40 stand for first–fourth adsorption devices. These adsorption devices 10, 20, 30, 40 are filled with a coolant (in this embodiment, water) and contain adsorbents 11, 21, 31, 41, such as silica gel and the like, which adsorb evaporated coolant and desorb the adsorbed coolant during heating. Adsorption cores 12, 22, 32, 42 are adhesively bonded to the surface to the adsorbents 11, 21, 31, 41, and provide heat exchange between the adsorbents 11, 21, 31, 41 and a heat medium (in this embodiment, water mixed with an ethylene glycol-based antifreeze; identical to engine cooling water). Evaporation and condensation cores 13, 23, 33, 43 provide heat exchange between heating medium and coolant. The inside of the first–fourth adsorption devices 10, 20, 30, 40 is maintained almost under vacuum.

Internal heat exchanger 50 (cooling device), in which heating medium cooled in the evaporation and condensation cores 13, 23, 33, 43 circulates, cools the air (object of cooling) blown out into the compartment. Adsorbents 11, 21, 31, 41 are heated with the waste heat (engine cooling water) of engine 60 as a heat source.

An external heat exchanger (cooling means) 70 provides heat exchange between heating medium and outside air and supplies heating medium, having a temperature lower than that of the engine cooling water, (high-temperature heat medium) to first–fourth adsorption devices 10, 20, 30, 40. First–third electric pumps 81–83 circulate heating medium (including engine cooling water) between the first–fourth adsorption devices 10, 20, 30, 40, internal heat exchanger 50, external heat exchanger 60 (sic), and engine 60.

Electric selector valves 91–101 switch heating medium flow. Valves 91–96, 100 are four-way valves, valves 97, 98 are three-way valves, and the valves 99, 100 are two-way valves.

A first water temperature sensor 102 (first temperature detection means) detects the temperature of heating medium flowing out of engine 60 and to the first–fourth adsorption devices 10, 20, 30, 40. A second water temperature sensor 103 (second temperature detection means) detects the temperature of heating medium returning to engine 60 from the first–fourth adsorption devices 10, 20, 30, 40. A third water temperature sensor 104 (third temperature detection means) detects the temperature of heating medium flowing out of the external heat exchanger 70.

A radiator 61 cools the engine cooling water, and a thermostat 62 maintains the temperature of the engine cooling water at the prescribed level (80–110° C.) by adjusting the rate of flow passing through the radiator 61. An outside air sensor 105 (outside air temperature detection means) detects the external air temperature, an inflow air temperature sensor 106 (inflow air temperature detection means) detects the temperature of the air flowing into the internal heat exchanger 50, the detected values of these sensors 102–106 are input to an electronic control unit (ECU) 110.

The ECU 110 (switching control means) controls the first–third pumps 81–83 and selector valves 91–101 according to the preset program based on the detected values of sensors 102–106.

The base operation states of the air conditioner for vehicles (adsorption-type cooling apparatus) of the present embodiment will be described below.

1. First State (I)

Figure 2:
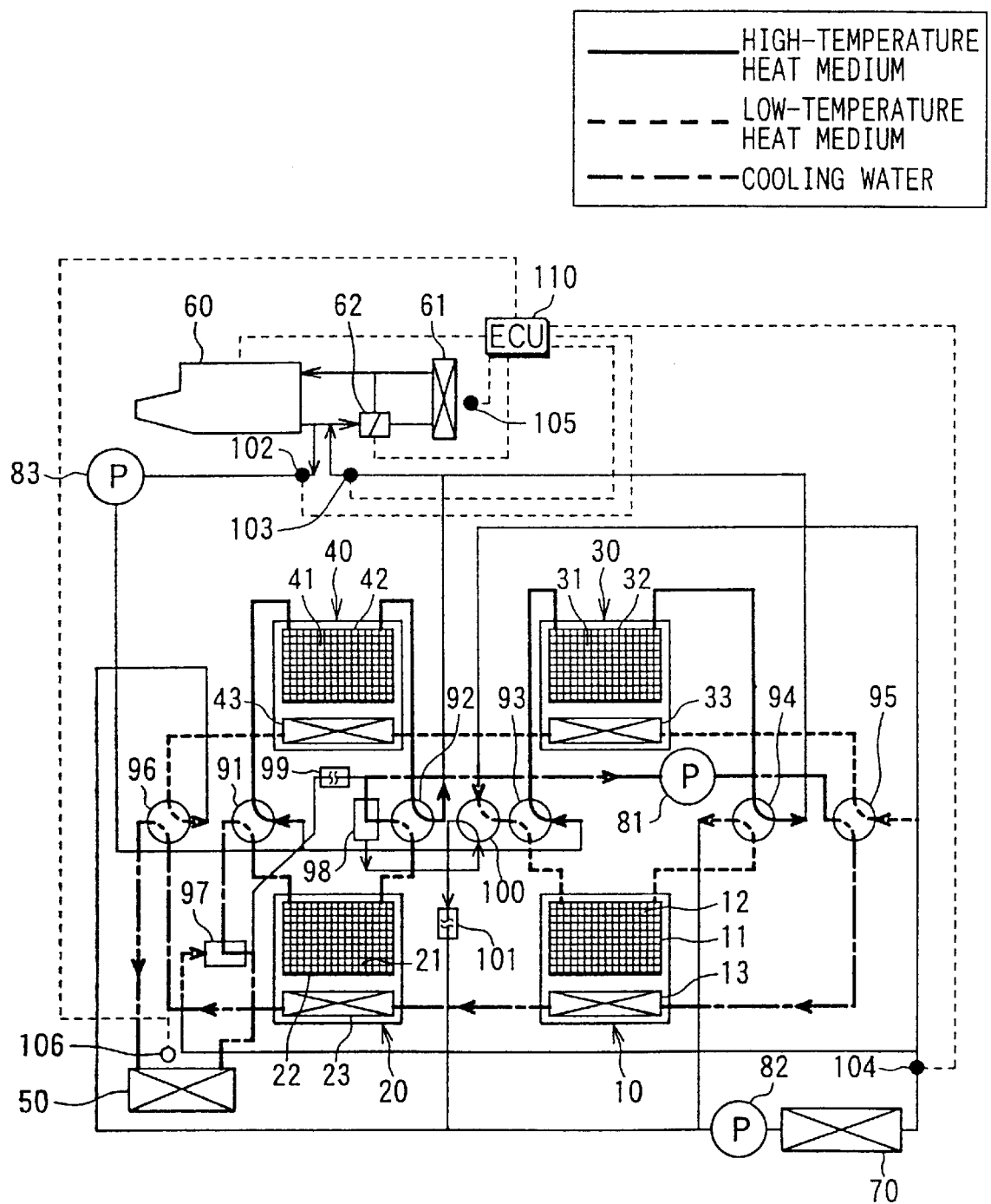
FIG. 2 is a schematic view showing the first state of the adsorption-type cooling apparatus of Embodiment 1 of the present invention.

In the first state, as shown in FIG. 2, heating medium is circulated between the internal heat exchanger 50 and evaporation and condensation cores 13, 23 of the first and second adsorption devices 10, 20. The low-temperature heat medium (heat medium cooled in the external heat exchanger 70) is circulated to adsorption core 12 of the first adsorption device 10, and heating medium exiting the internal heat exchanger 50 is circulated to adsorption core 22 of the second adsorption device 20. Meanwhile, the high-temperature heat medium (engine cooling water exiting engine 60) is circulated to adsorption cores 32, 42 of the third and fourth adsorption devices 30, 40 and the low-temperature heat medium is circulated to evaporation and condensation cores 33, 43 of the third and fourth adsorption devices 30, 40.

2. Second State (II)

Figure 3:
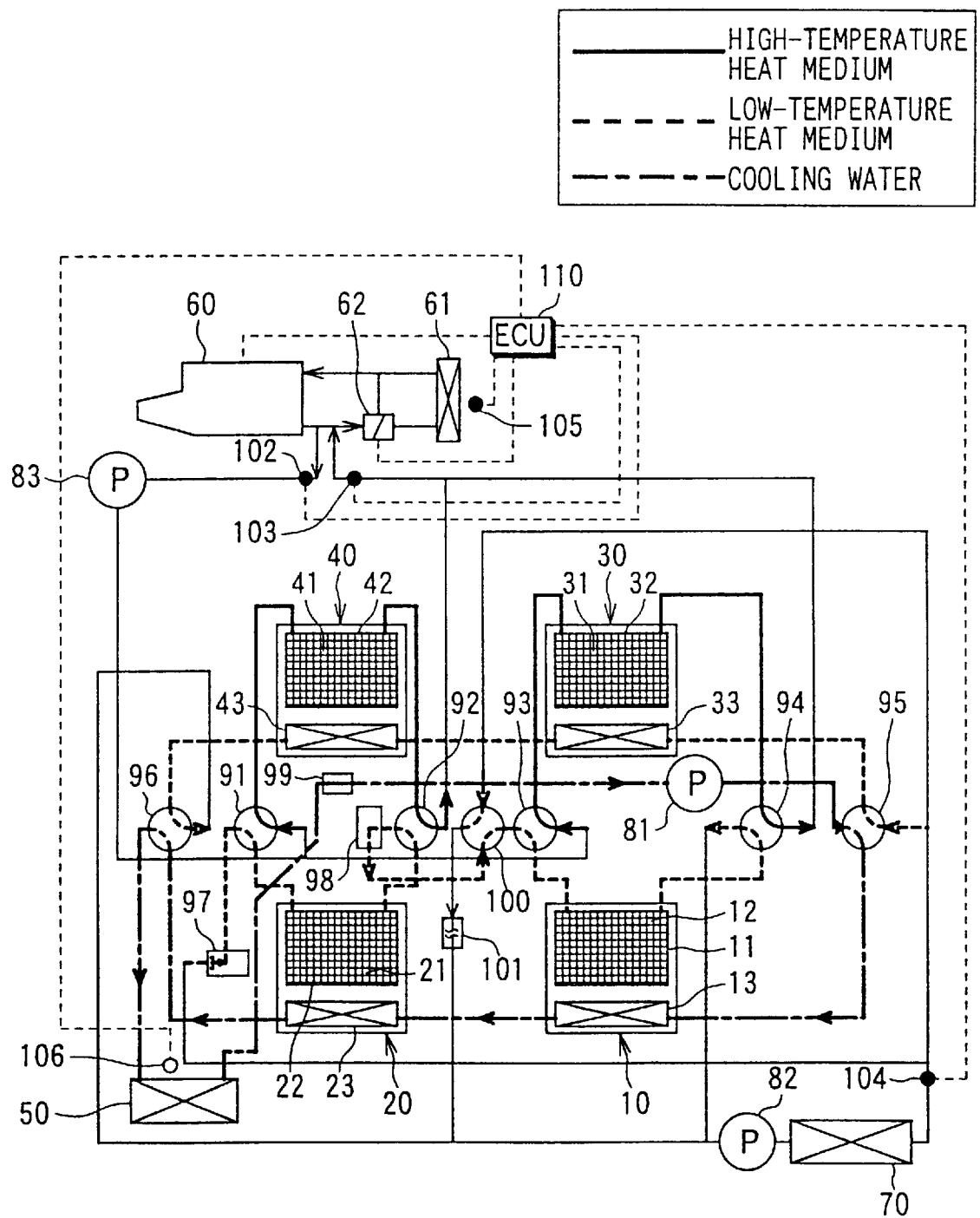
FIG. 3 is a schematic view showing the second state of the adsorption-type cooling apparatus of Embodiment 1 of the present invention.

In the second state, as shown in FIG. 3, heating medium is circulated between the internal heat exchanger 50 and evaporation and condensation cores 13, 23 of the first and second adsorption devices 10, 20 and the low-temperature heat medium is circulated to adsorption cores 12, 22 of the first and second adsorption devices 10, 20. Meanwhile, the high-temperature heat medium is circulated to adsorption cores 32, 42 of the third and fourth adsorption devices 30, 40 and the low-temperature heat medium is circulated to evaporation and condensation cores 33, 43 of the third and fourth adsorption devices 30, 40.

Third State (III)

Figure 4:
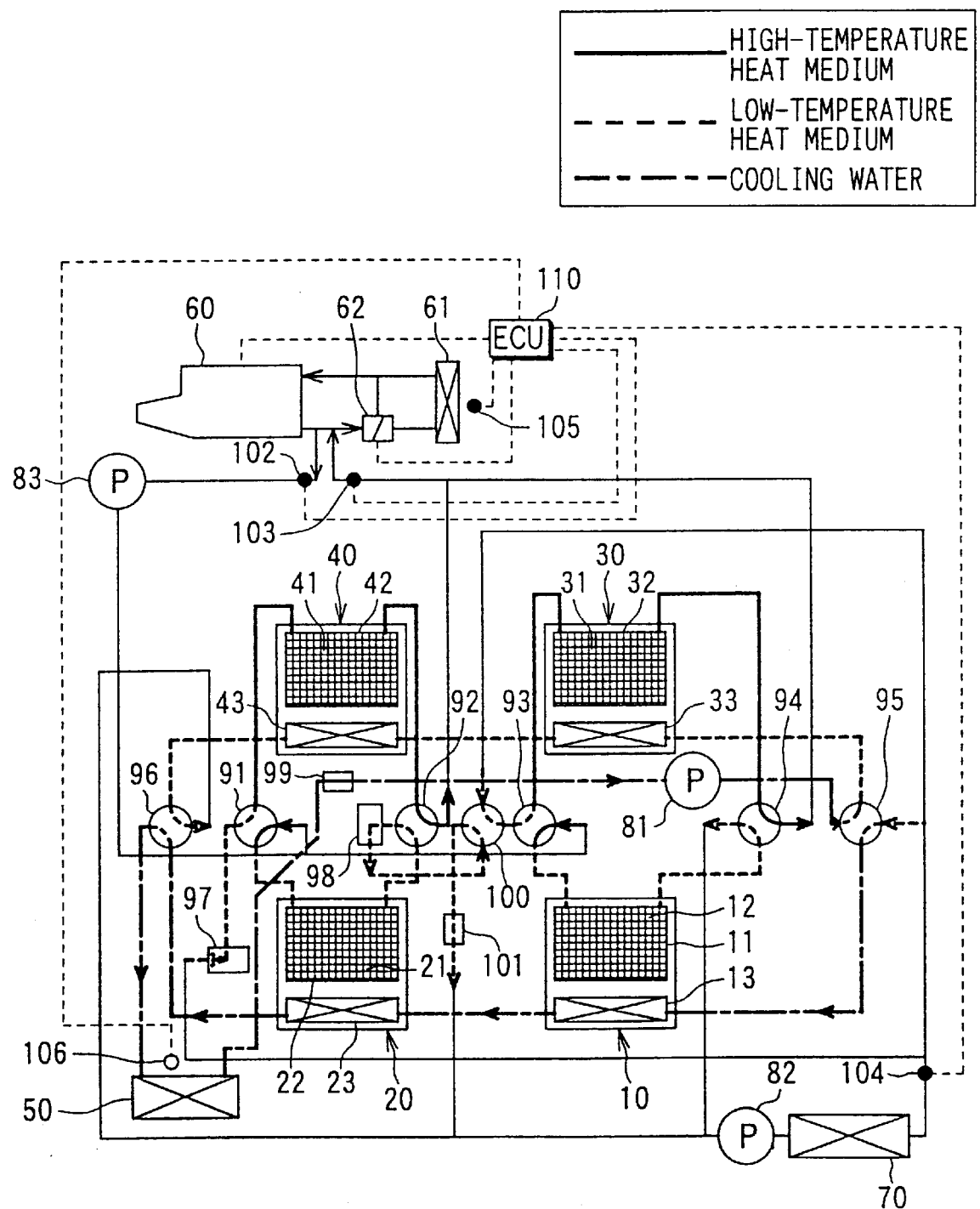
FIG. 4 is a schematic view showing a third state of the adsorption-type cooling apparatus of Embodiment 1 of the present invention.

In the third state, as shown in FIG. 4, the low-temperature heat medium is supplied to evaporation and condensation cores 13, 23 of the first and second adsorption devices 10, 20 and the high-temperature heat medium is supplied to the inlet openings of adsorption cores 12, 22 of the first and second adsorption devices 10, 20. Meanwhile, the low-temperature heat medium is supplied into the inlet openings of adsorption cores 32, 42 of the third and fourth adsorption devices 30, 40 and heating medium exiting the internal heat exchanger 50 is supplied to the inlet openings of evaporation and condensation cores 33, 43 of the third and fourth adsorption devices 30, 40.

Fourth State (VI)

Figure 5:
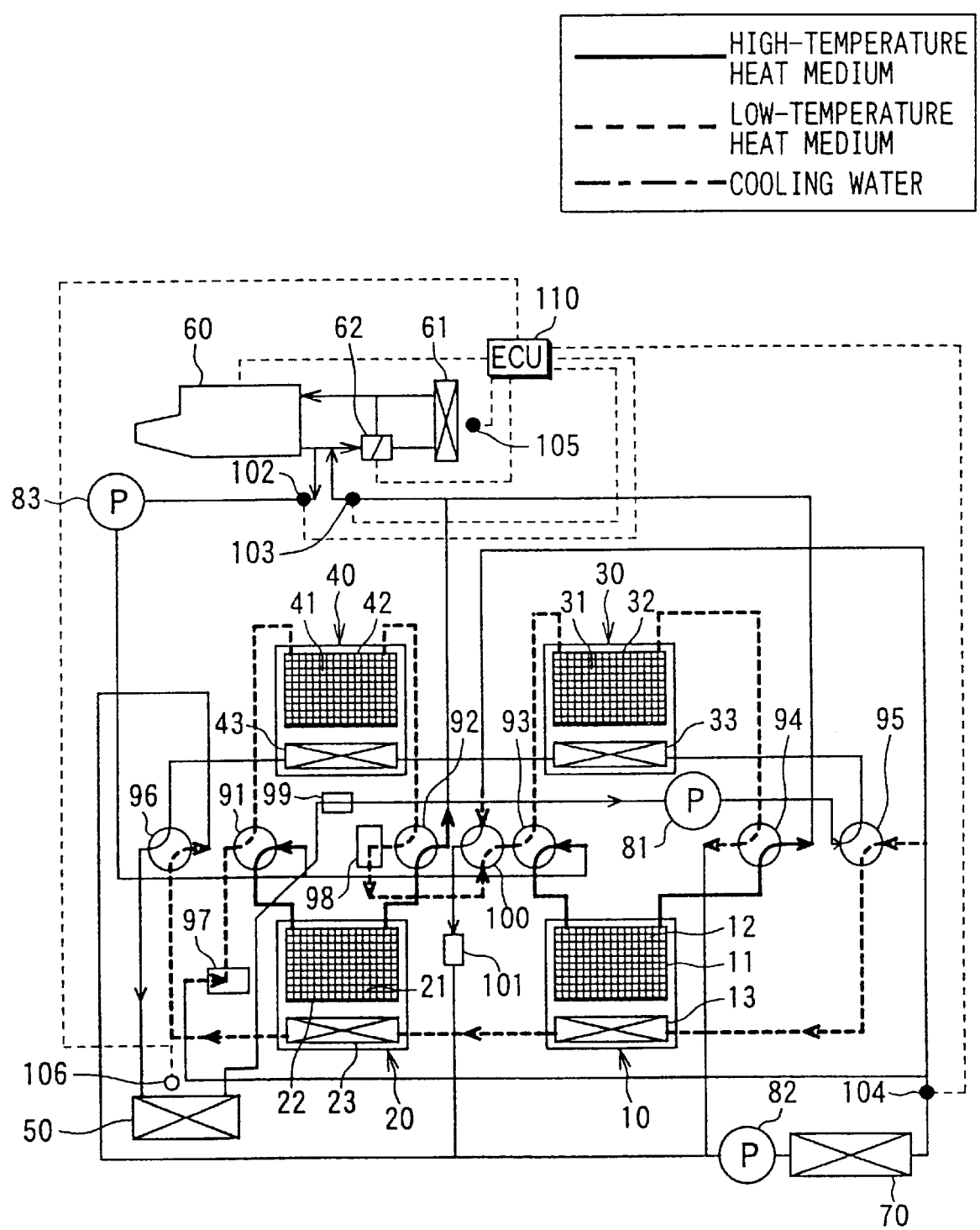
FIG. 5 is a schematic view showing a fourth state of the adsorption-type cooling apparatus of Embodiment 1 of the present invention.

In the fourth state, as shown in FIG. 5, the low-temperature heat medium is circulated to evaporation and condensation cores 13, 23 of the first and second adsorption devices 10, 20 and the high-temperature heat medium is circulated to the adsorption cores 12, 22 of the first and second adsorption devices 10, 20. Meanwhile, the low-temperature heat medium is circulated to the adsorption cores 32, 42 of the third and fourth adsorption devices 30, 40. when the evaporation and condensation cores 33, 43 of the third and fourth adsorption devices 30, 40 are filled with heating medium exiting internal heat exchanger 50, the first pump 81 is stopped and the circulation of heating medium in the evaporation and condensation cores 33, 43 is terminated.

Fifth State (V)

Figure 6:
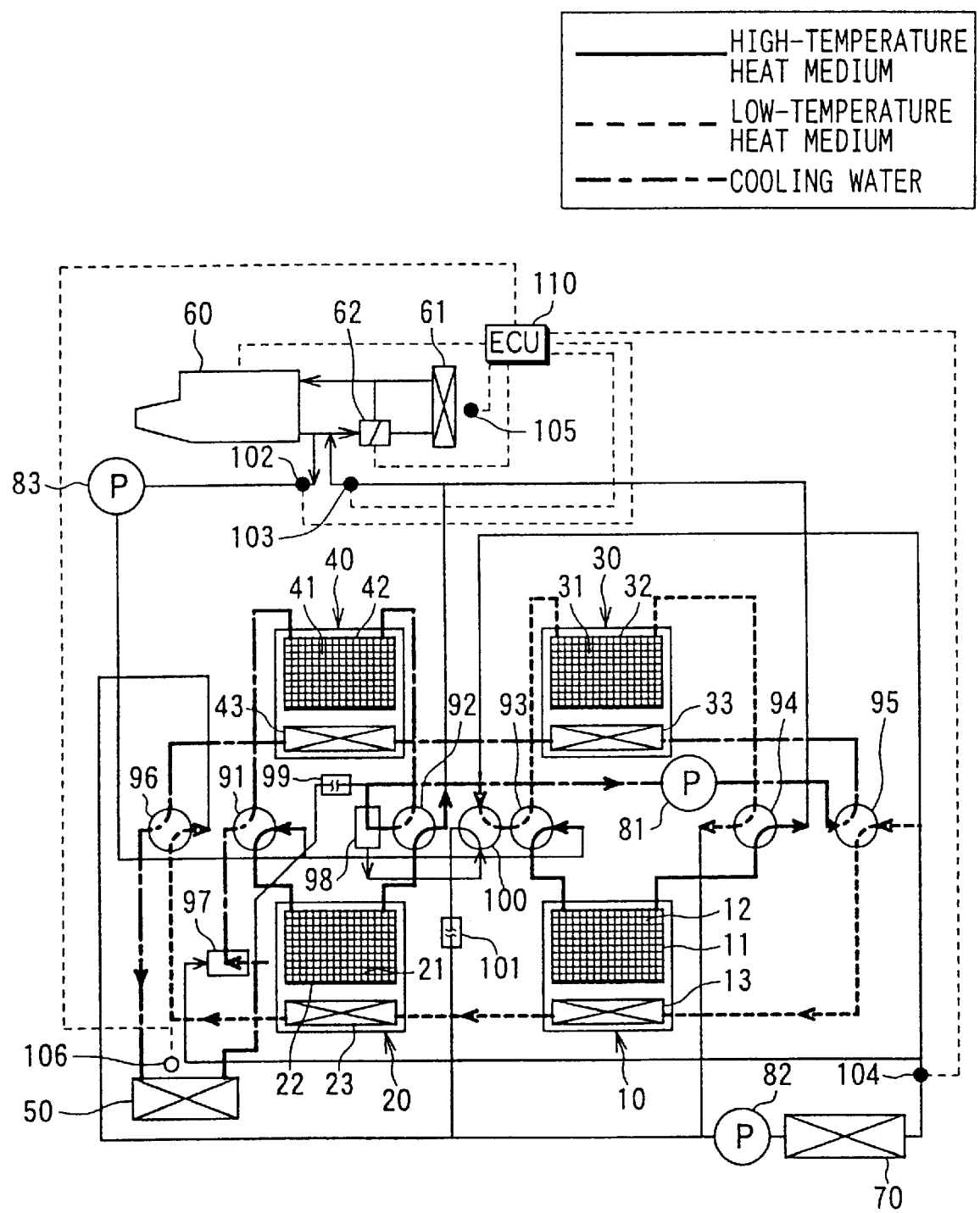
FIG. 6 is a schematic view showing a fifth state of the adsorption-type cooling apparatus of Embodiment 1 of the present invention.

In the fifth state, as shown in FIG. 6, heating medium is circulated between the internal heat exchanger 50 and evaporation and condensation cores 33, 43 of the third and fourth adsorption devices 30, 40. The low-temperature heat medium is circulated to the adsorption core 32 of the third adsorption device 30, and heating medium exiting the internal heat exchanger 50 is circulated to adsorption core 43 of the fourth adsorption device 40. Meanwhile, the high-temperature heat medium is circulated to adsorption cores 12, 22 of the first and second adsorption devices 10, 20 and the low-temperature heat medium is circulated to evaporation and condensation cores 13, 23 of the first and second adsorption devices 10, 20.

Sixth State (VI)

Figure 7:
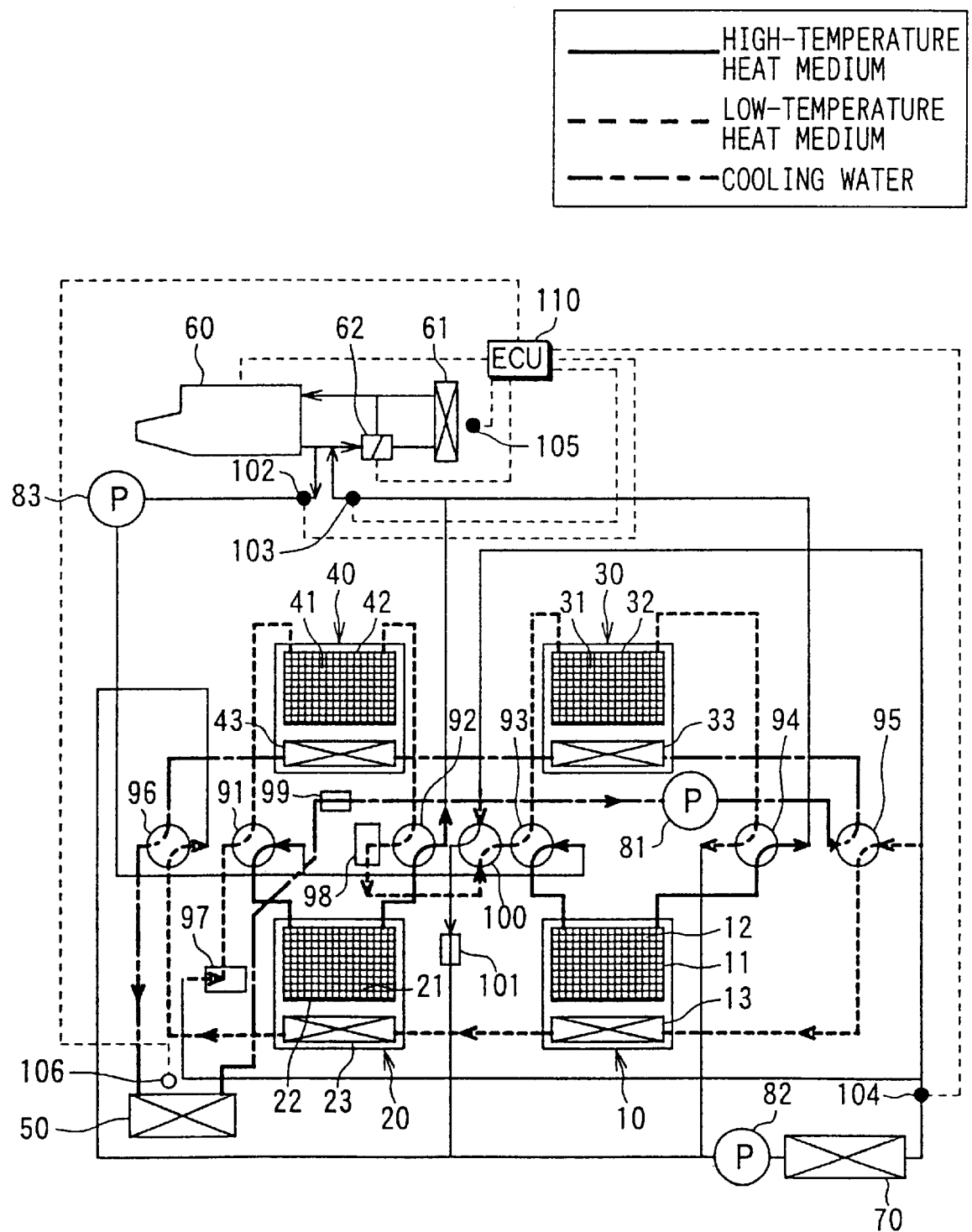
FIG. 7 is a schematic view showing a sixth state of the adsorption-type cooling apparatus of Embodiment 1 of the present invention.

In the sixth state, as shown in FIG. 7, heating medium is circulated between the internal heat exchanger 50 and evaporation and condensation cores 33, 43 of the third and fourth adsorption devices 30, 40. The low-temperature heat medium is circulated to the adsorption cores 32, 42 of the third and fourth adsorption device 30, 40. Meanwhile, the high-temperature heat medium is circulated to adsorption cores 12, 22 of the first and second adsorption devices 10, 20 and the low-temperature heat medium is circulated to evaporation and condensation cores 13, 43 (sic) of the first and second adsorption devices 10, 20.

Seventh State (VII)

Figure 8:
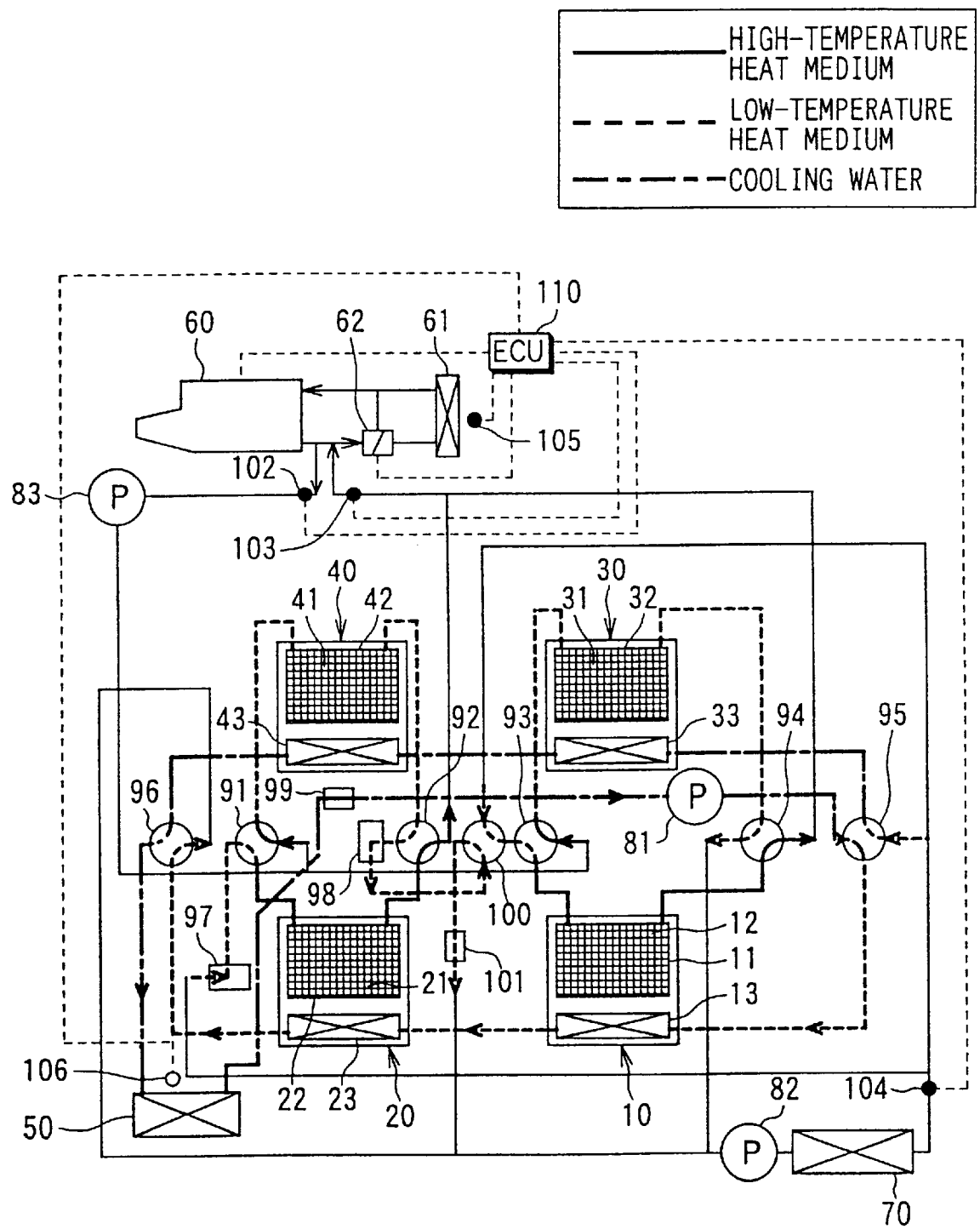
FIG. 8 is a schematic view showing a seventh state of the adsorption-type cooling apparatus of Embodiment 1 of the present invention.

In the seventh state, as shown in FIG. 8, the low-temperature heat medium is supplied to the inlet openings of evaporation and condensation cores 33, 43 of the third and fourth adsorption devices 30, 40. The high-temperature heat medium is supplied to the inlet openings of adsorption cores 32, 42 of the third and fourth adsorption device 30, 40. Meanwhile the low-temperature heat medium is supplied to adsorption cores 12, 22 of the first and second adsorption devices 10, 20 and heating medium exiting the internal heat exchanger 50 is supplied to the inlet openings of evaporation and condensation cores 13, 23 of the first and second adsorption devices 10, 20.

Eighth State (VIII)

Figure 9:
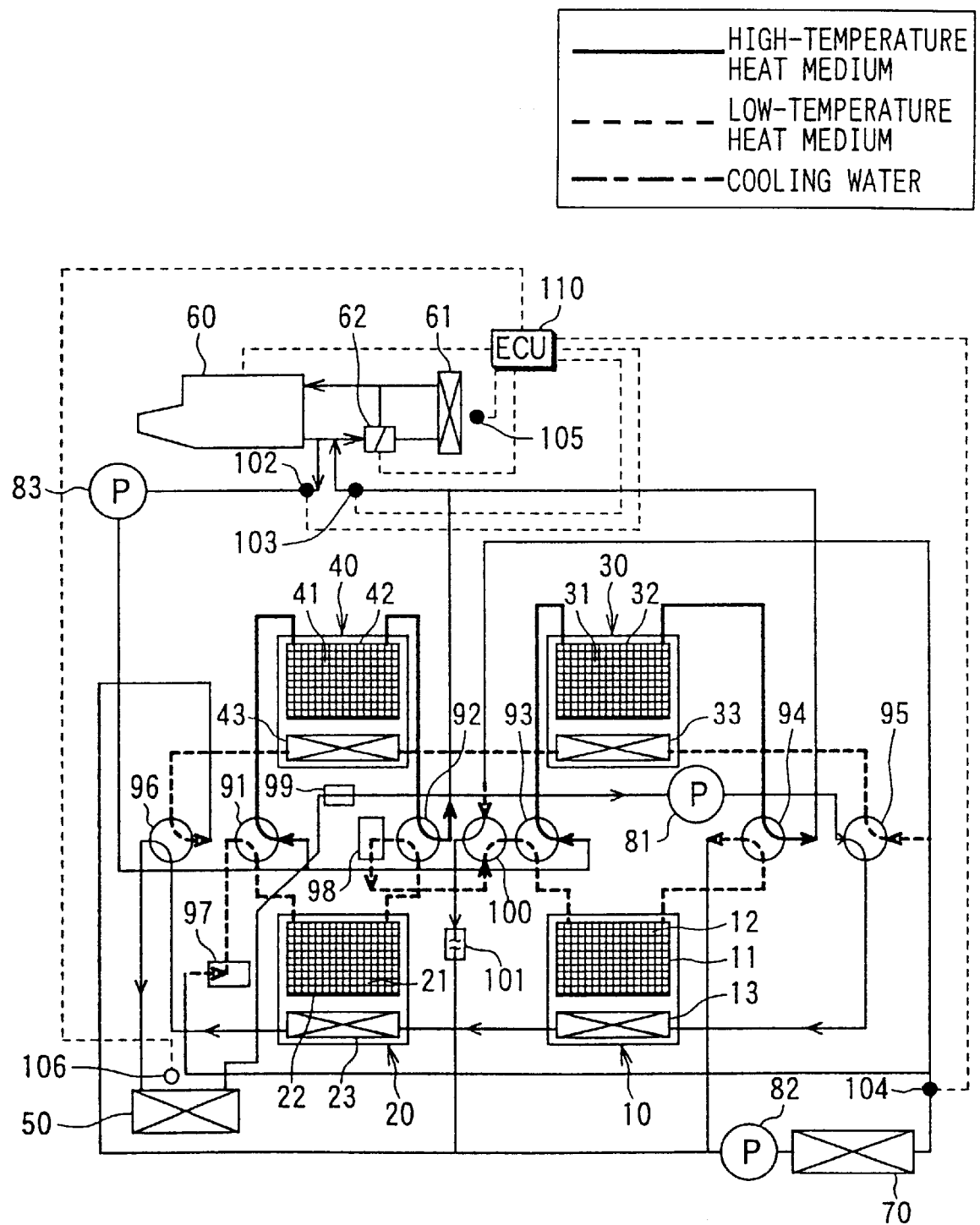
FIG. 9 is a schematic view showing an eighth state of the adsorption-type cooling apparatus of Embodiment 1 of the present invention.

In the eighth state, as shown in FIG. 9, the low-temperature heat medium is circulated to evaporation and condensation cores 33, 43 of the third and fourth adsorption devices 30, 40. The high-temperature heat medium is circulated to the adsorption cores 32, 42 of the third and fourth adsorption device 30, 40. Meanwhile, the low-temperature heat medium is circulated to adsorption cores 12, 22 of the first and second adsorption devices 10, 20 and when the evaporation and condensation cores 13, 23 of the first and second adsorption devices 10, 20 are filled with heating medium exiting internal heat exchanger 50, the first pump 81 is stopped and the circulation of heating medium in the evaporation and condensation cores 13, 23 is terminated.

Figure 10:
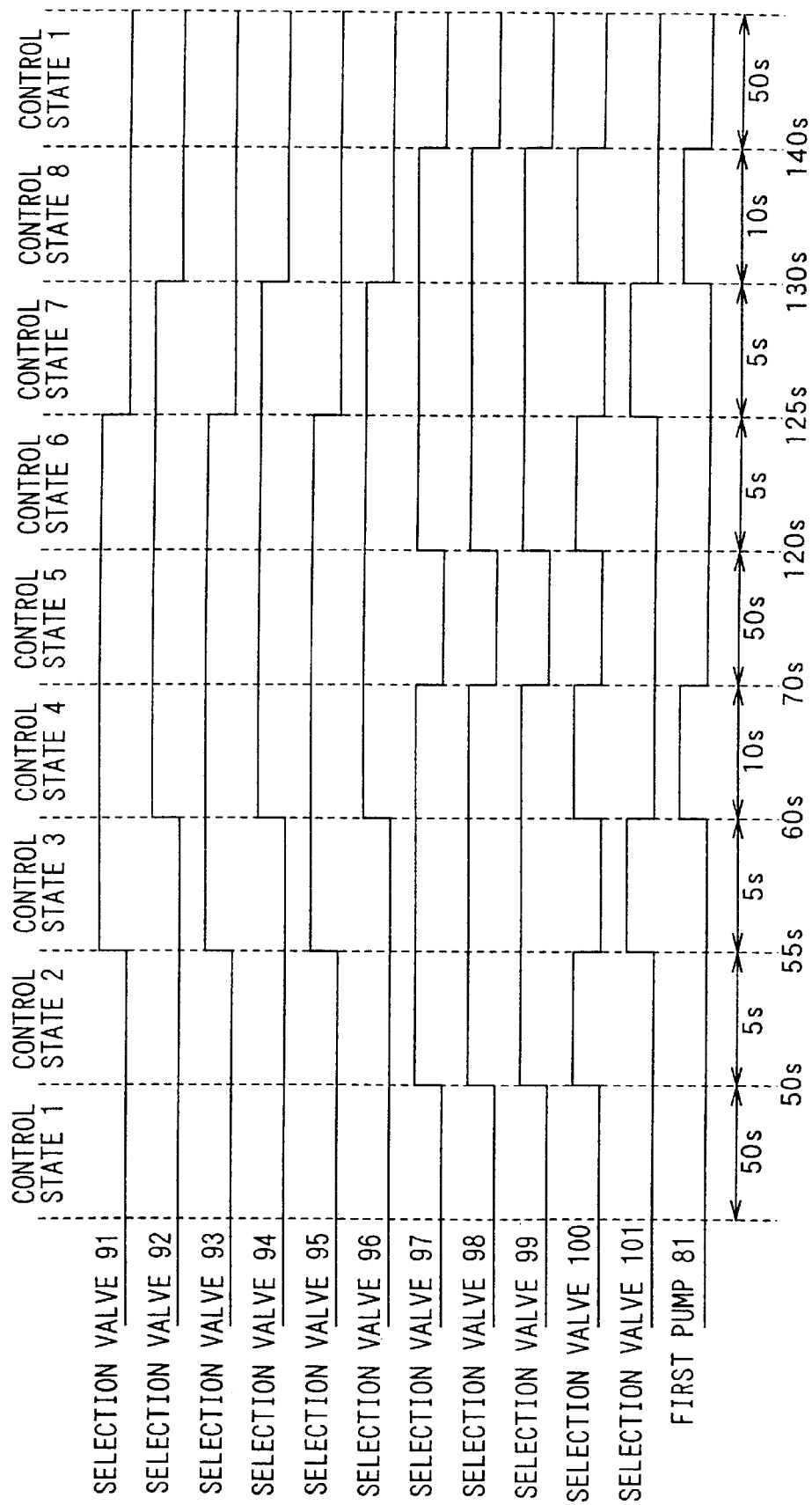
FIG. 10 is a chart showing the operation of the selector valves and first pump of the adsorption-type cooling apparatus of Embodiment 1 of the present invention.
Figure 11:
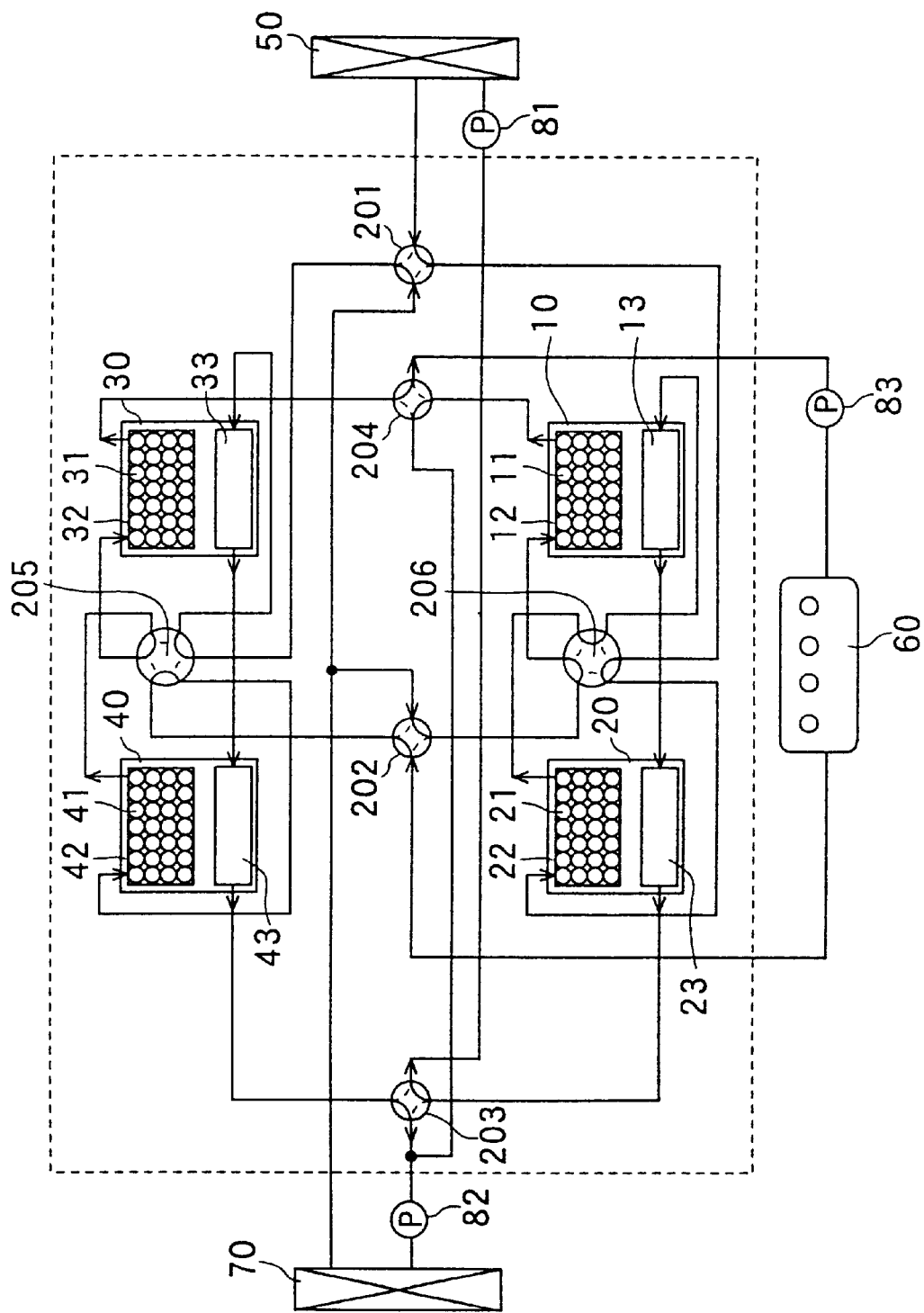
FIG. 11 is a schematic view of the adsorption-type cooling apparatus of Embodiment 6 of the present invention.

FIG. 10 is a diagram illustrating the operation of selector valves 91–101 and first pump 81. Here, the operation time of the first and fifth states was selected based on the time required for the water (evaporated coolant) adsorption ability to be saturated. This time varies depending on the relative humidity range inside the adsorption devices during adsorption operation or the type and amount of the adsorbent.

The operation of the present embodiment will be described below based on the aforesaid first–eight states.

1. Normal Operation Mode

In the normal operation mode, a first switching control pattern is realized in which the states are switched in the following order: first state (I)→second state (II)→third state (III)→fourth state (IV)→fifth state (V)→sixth state (VI) →seventh state (VII)→eighth state (VIII)→first state (I).

Here, the operation time of the third state (III) and seventh state (VII) is referred to as the time required to replace the low-temperature heat medium present inside the evaporation and condensation cores of the adsorption devices that have been in the desorption process with heating medium exiting the internal heat exchanger 50. This time is determined by the yield of the first pump 81 and the volume of heating medium channel inside evaporation and condensation cores 13, 23 or 33, 43.

In the desorption process, the adsorbed coolant is desorbed and discharged by supplying a high-temperature heat medium to the adsorption cores, having adsorbent that adsorbed coolant, and heating the adsorbent. More specifically, the third and fourth adsorption devices 30, 40 in the first–fourth states and the first and second adsorption devices 10, 20 in the fifth–seventh states are in the desorption process.

Thereupon, in the normal operation mode, air flowing out into the compartment in the first–third states and fifth–seventh states is cooled. However, in the first and fifth state, the adsorbent is cooled by heating medium flowing out of the internal heat exchanger 50. Therefore, in the first state, the cooling capacity of cooling air flowing out into the compartment is the cooling capacity generated in the first adsorption device 1. In the fifth state, it is the cooling capacity generated by the third adsorption device 30.

In the adsorption process, the liquid-phase coolant present inside the adsorption devices is evaporated and the evaporated vapor (gas-phase) coolant is adsorbed by the adsorbent. The cooling capacity in the adsorption device, undergoing the adsorption process, is demonstrated owing to the latent heat of evaporation of the coolant.

In this connection, the second adsorption device 20 in the first state and the fourth adsorption device 40 in the fifth state decrease the temperature of heating medium cooled in the first adsorption device 10 and third adsorption device 30 to a temperature that enables heat exchange with the internal air and does not increase the heat removed from the air blown out into the compartment.

2. High-load Operation Mode

The high-load operation mode is a mode implemented when the temperature (detected temperature of inflow air temperature sensor 106) of the air flowing into the internal heat exchanger 50 is no less than about 40° C. and the thermal load required in the internal heat exchanger 50 is high. In this mode, a second switching control pattern is realized comprising switching the states in the following order: fourth state (IV)→seventh state (VII)→eighth state (VIII)→third state (III)→fourth state (IV).

Thereupon, in the high-load operation mode, cooling of the adsorbent of the adsorption devices in the adsorption process by heating medium flowing out of the internal heat exchanger 50 is avoided by omitting the first and fifth states. As a result, almost the entire cooling capacity generated in the two adsorption devices which are in the adsorption process can contribute to the cooling of the air blown out into the compartment and can correspond to a high thermal load.

Furthermore, in a high-load operation mode, the adsorbent of the adsorption devices, not undergoing the adsorption process, are not cooled by heating medium flowing out of the internal heat exchanger 50. Therefore, the temperature of the air blown out into the compartment cannot be decreased to the same degree as in the normal operation mode. However, as described above, since almost the entire cooling capacity generated by the two adsorption devices which are in the adsorption process can contribute to cooling of the air blown out into the compartment, the coefficient of performance of the adsorption-type cooling apparatus can be increased and the waste heat of engine 60 can be effectively utilized.

The coefficient of performance of the adsorption-type cooling apparatus in this case is the value obtained by dividing the amount of heat removed from the air blown out into the compartment by the amount of heat supplied from engine 60.

3. Low-load Operation Mode

The low-load operation mode is a mode implemented when the temperature of the air flowing into the internal heat exchanger 50 is not lower than about 22° C. and not higher than 27° C., and the thermal load required in the internal heat exchanger 50 is small. More specifically, in this mode, similar to the high-load operation mode, a second switching control pattern is realized comprising switching the states in the following order: fourth state (IV)→seventh state (VII) →eighth state (VIII) →third state (III)→fourth state (IV).

As a result, similar to the high-load operation mode, though the temperature of the air flowing into the internal heat exchanger 50 cannot be largely decreased, since the temperature of the air flowing into the internal heat exchanger 50 is low, the coefficient of performance of the adsorption-type cooling apparatus can be increased while the temperature of the air blown out into the compartment is lowered to a level sufficient for practical purposes.

4. Extended Operation Mode

The extended operation mode is a mode implemented when the operation time of the first and fifth states is extended from the initial set time (see FIG. 10). More specifically, a third switching control pattern is realized that comprises switching the states in the following order: first state (I)→third state (III)→fourth state (IV)→fifth state (V)→seventh state (VII)→eighth state (VIII)→first state (I).

In the extended operation mode, the second and sixth states are omitted. Therefore, for example, in a transition from the first state to the third and fourth states, heating medium that has entered the adsorption core 22 during the adsorption process (in the first state) flows as is in evaporation and condensation cores 33, 43 of the adsorption devices 30, 40 which are subsequently in the adsorption process. It is possible that the evaporation and condensation cores 33, 43 will be heated by heating medium heated by the adsorption core 22.

However, when the operation time of the first and fifth states is extended from the initial set time, the water adsorption capacity (amount of adsorbed water) of the adsorbent is decreased and the heat of adsorption which is generated during water adsorption is decreased. Therefore, even though heating medium that has entered the adsorption core during the adsorption process flows as is in the evaporation and condensation cores of the adsorption devices, it causes no practical problems.

Furthermore, in the extended operation mode of the present embodiment, the operation time of the first and fifth states is extended from the initial set time till the difference between the temperature (detected temperature of the first water temperature sensor 102) of the supplied heat medium which flows out of engine 60 and into the first–fourth adsorption devices 10, 20, 30, 40 and the temperature (detected temperature of the second water temperature sensor 103) of the outflow heat medium which returns from the first–fourth adsorption devices 10, 20, 30, 40 to engine 60 becomes the preset temperature difference.

Herein, the prescribed temperature difference is referred to a state with a temperature difference of about 0° C., more specifically, of no less than 1° C. and no more than about 5° C.

Specific features of the present embodiment will be described below.

The heat medium flowing out of the internal heat exchanger 50 which cooled the adsorption cores in the first and fifth states is supplied to the evaporation and condensation cores undergoing the adsorption process, without being supplied to the adsorption cores, in the second and sixth states. For this reason, the supply of heating medium, heated while cooling the adsorption cores, to the evaporation and condensation cores undergoing the adsorption process in the next stage can be prevented.

Therefore, heating of the evaporation and condensation cores undergoing the adsorption process in the next stage can be prevented in advance. As a result, it is possible to prevent the loss of cooling capacity of the adsorption-type cooling apparatus (air conditioner) in the normal operation mode, high-load operation mode, and low-mode operation mode.

Furthermore, in the third and seventh states, heating medium exiting internal heat exchanger 50 is supplied to the evaporation and condensation cores undergoing the adsorption process in the next stage. For this reason, it is possible to discharge the low-temperature heat medium which flows out of external heat exchanger 70 having a temperature higher than that of heating medium circulating in the internal heat exchanger 50. Therefore, the evaporation and condensation cores undergoing the adsorption process in the next stage can be cooled which makes it possible to prevent the loss of cooling capacity of the adsorption-type cooling apparatus (air conditioner) in the normal operation mode, high-load operation mode, low-mode operation mode, and extended operation mode.

Furthermore, since in the extended operation mode a transition is made to the third and seventh state without implementing the second and sixth states, the working process of the adsorption-type cooling apparatus can be shortened which makes it possible to use effectively the heat supplied from engine 60 as a heat source (energy) driving the adsorption-type cooling apparatus and to increase the coefficient of performance of the adsorption-type cooling apparatus.

Furthermore, since in the extended operation mode the operation time of the first and fifth states is extended from the initial set time until the difference between the temperature of the supplied heat medium and the temperature of heating medium that flows out becomes the prescribed temperature difference, almost the entire amount of water adsorbed by the adsorbent can be desorbed and discharged. Therefore, the heat supplied from engine 60 can be effectively used as a heat source (energy) driving the adsorption-type cooling apparatus, which makes it possible to increase the coefficient of performance of the adsorption-type cooling apparatus.

Embodiment 2

In Embodiment 1, the flow rate of first pump 81 was almost constant regardless of the working state. In the second embodiment, the flow rate of heating medium supplied to the evaporation and condensation cores in the third state (III) or seventh state (VII) is made higher than the flow rate of heating medium supplied to the evaporation and condensation cores in the first state (I) or fifth state (V).

As a result, the operation time of the third state (III) or seventh state (VII) can be shorted, extending. the time period during which the adsorption-type cooling apparatus demonstrates cooling capacity and increasing the cooling capacity and coefficient of performance of the adsorption-type cooling apparatus.

Embodiment 3

In the extended operation mode of Embodiment 1, the operation time of the first and fifth states is extended from the initial set time until the difference between the temperature of the supplied heat medium and the temperature of heating medium that flows out becomes the prescribed temperature difference. However, in the third embodiment, the operation time of the first and fifth states is extended from the initial set time until the temperature of the supplied heat medium becomes the prescribed temperature (for example, no less than 80° C. and no higher than 100° C.).

During this time, the engine cooling water is controlled, as described above, so as to be maintained at the prescribed temperature. Therefore, extending the operation time of the first and fifth states from the initial set time until the temperature of the supplied heat medium becomes the prescribed temperature is identical to extending the operation time of the first and fifth states from the initial set time until the difference between the temperature of the supplied heat medium and the temperature of heating medium that flows out becomes the prescribed temperature difference.

Embodiment 4

In the extended operation mode of Embodiment 1, the operation time of the first and fifth states is extended from the initial set time until the difference between the temperature of the supplied heat medium and the temperature of heating medium that flows out becomes the prescribed temperature difference. However, in this embodiment, the operation time of the first and fifth states is extended from the initial set time until the temperature of heating medium that flows out becomes the prescribed temperature (for example, no less than 80° C. and no higher than 90° C.).

During this time, the engine cooling water is controlled, as described above, so as to be maintained at the prescribed temperature. Therefore, extending the operation time of the first and fifth states from the initial set time until the temperature of heating medium that flows out becomes the prescribed temperature is identical to extending the operation time of the first and fifth states from the initial set time until the difference between the temperature of the supplied heat medium and the temperature of heating medium that flows out becomes the prescribed temperature difference.

Embodiment 5

In the above-described embodiments, the operation time of the first and fifth states was based on the water adsorption capacity of the adsorbent. However, in the fifth embodiment, the operation state (caloric value) of engine 60 is detected and the operation time of the first and fifth states is variably controlled based on the detected values.

Furthermore, when the operation state (caloric value) of engine 60 is detected, it is desired that the setting be made based, for example, on the temperature of engine cooling water or the amount of fuel (injected amount of fuel) supplied to the engine.

Embodiment 6

In the above-described embodiments, the adsorption-type cooling apparatus was operated by using three-way and four-way valves for switching heating medium flow. By contrast, in the present embodiment, the adsorption-type cooling apparatus was constructed by using four-way valves 201–204 and six-way valves 205, 206.

Figure 12:
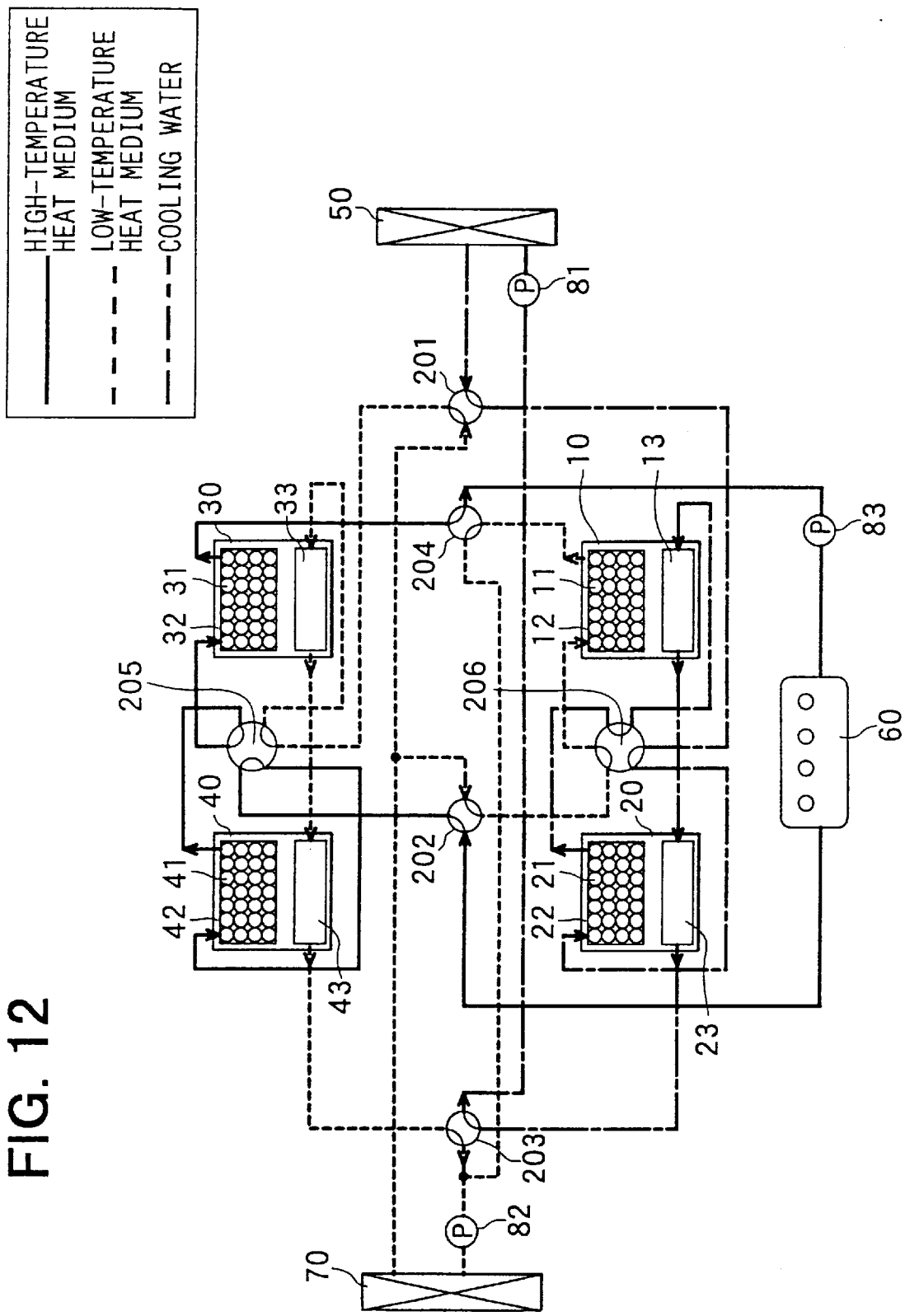
FIG. 12 is a schematic view showing a first state of the adsorption-type cooling apparatus of Embodiment 6 of the present invention.
Figure 13:
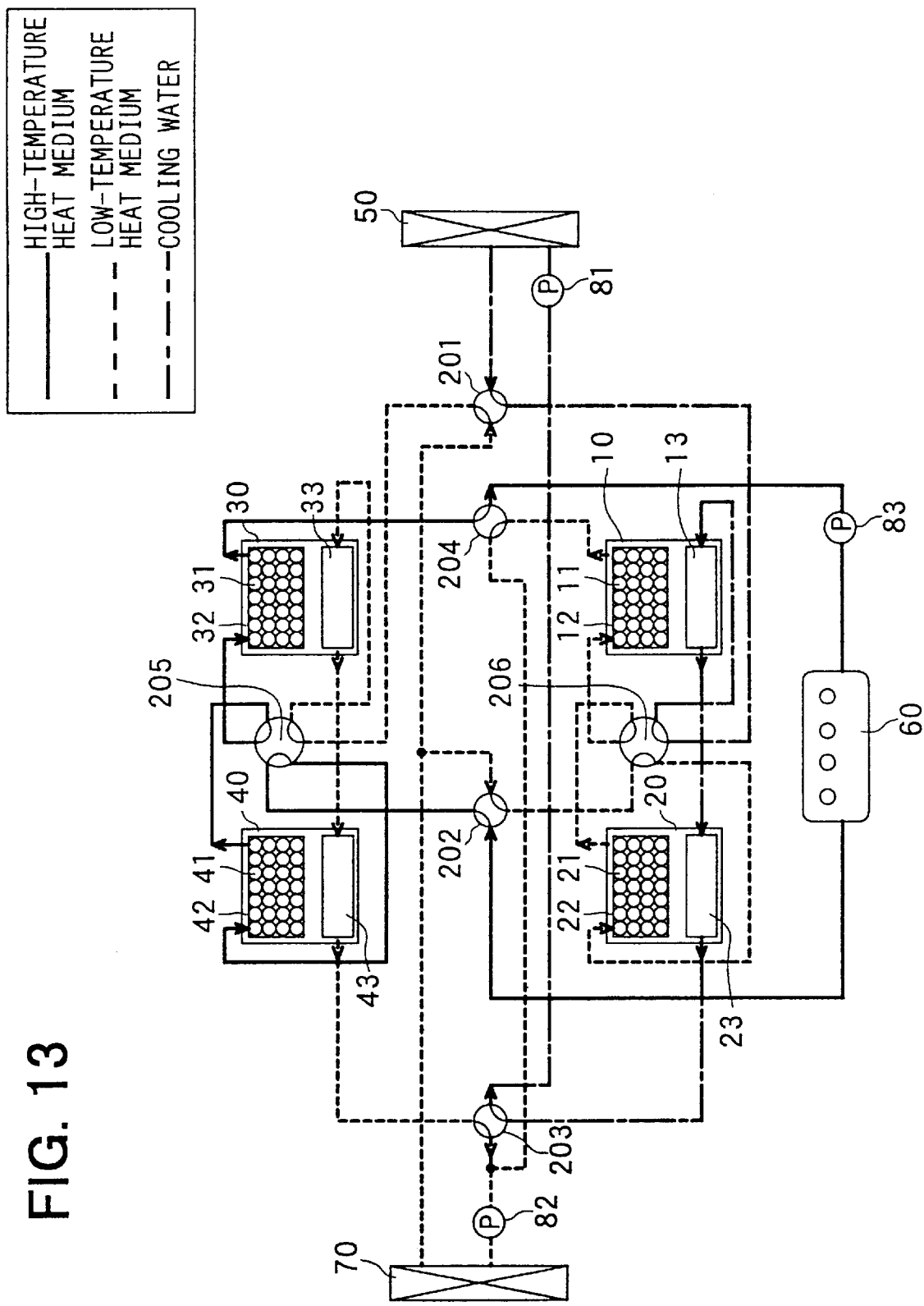
FIG. 13 is a schematic view showing a second state of the adsorption-type cooling apparatus of Embodiment 6 of the present invention.
Figure 14:
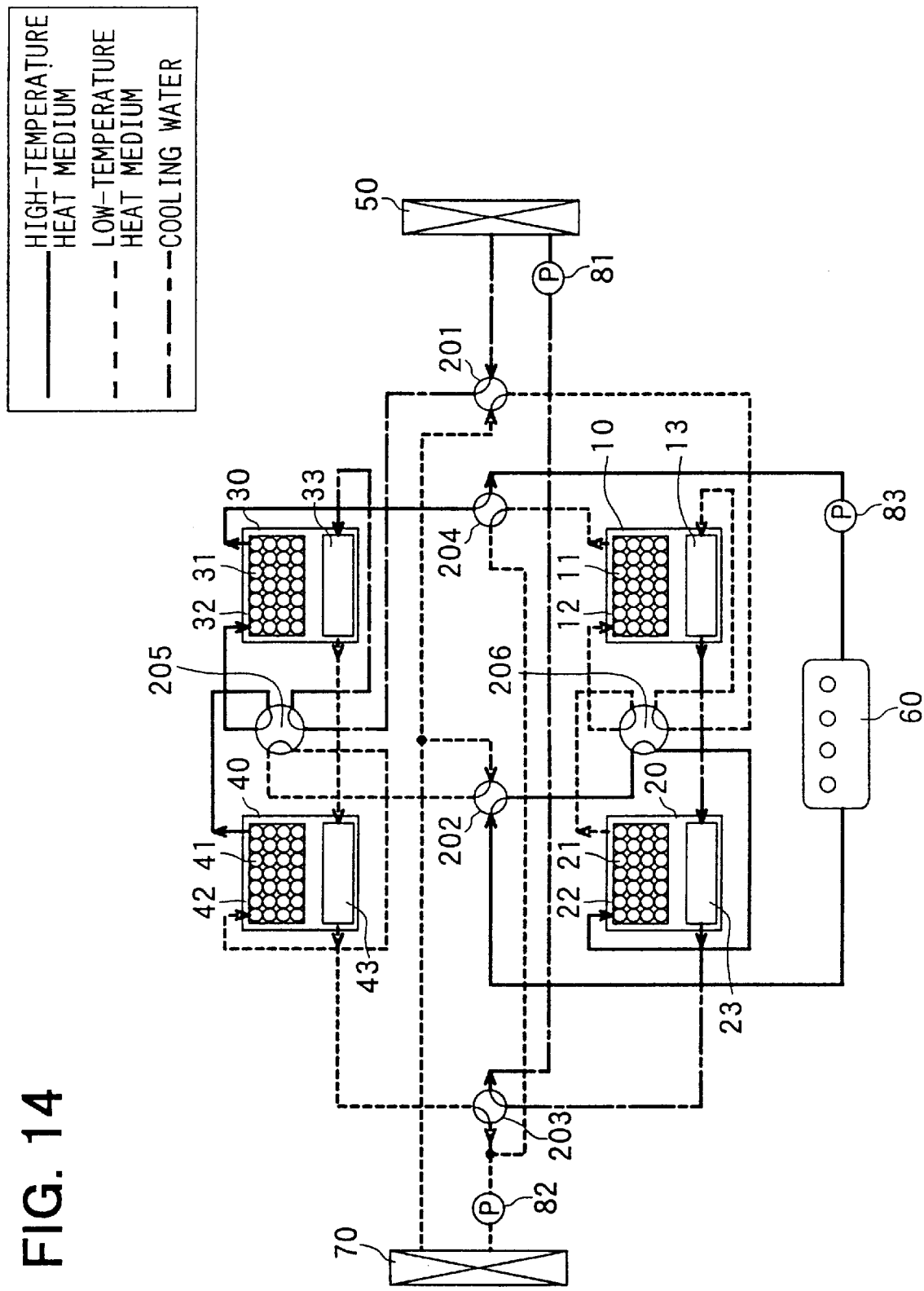
FIG. 14 is a schematic view showing a third state of the adsorption-type cooling apparatus of Embodiment 6 of the present invention.
Figure 15:
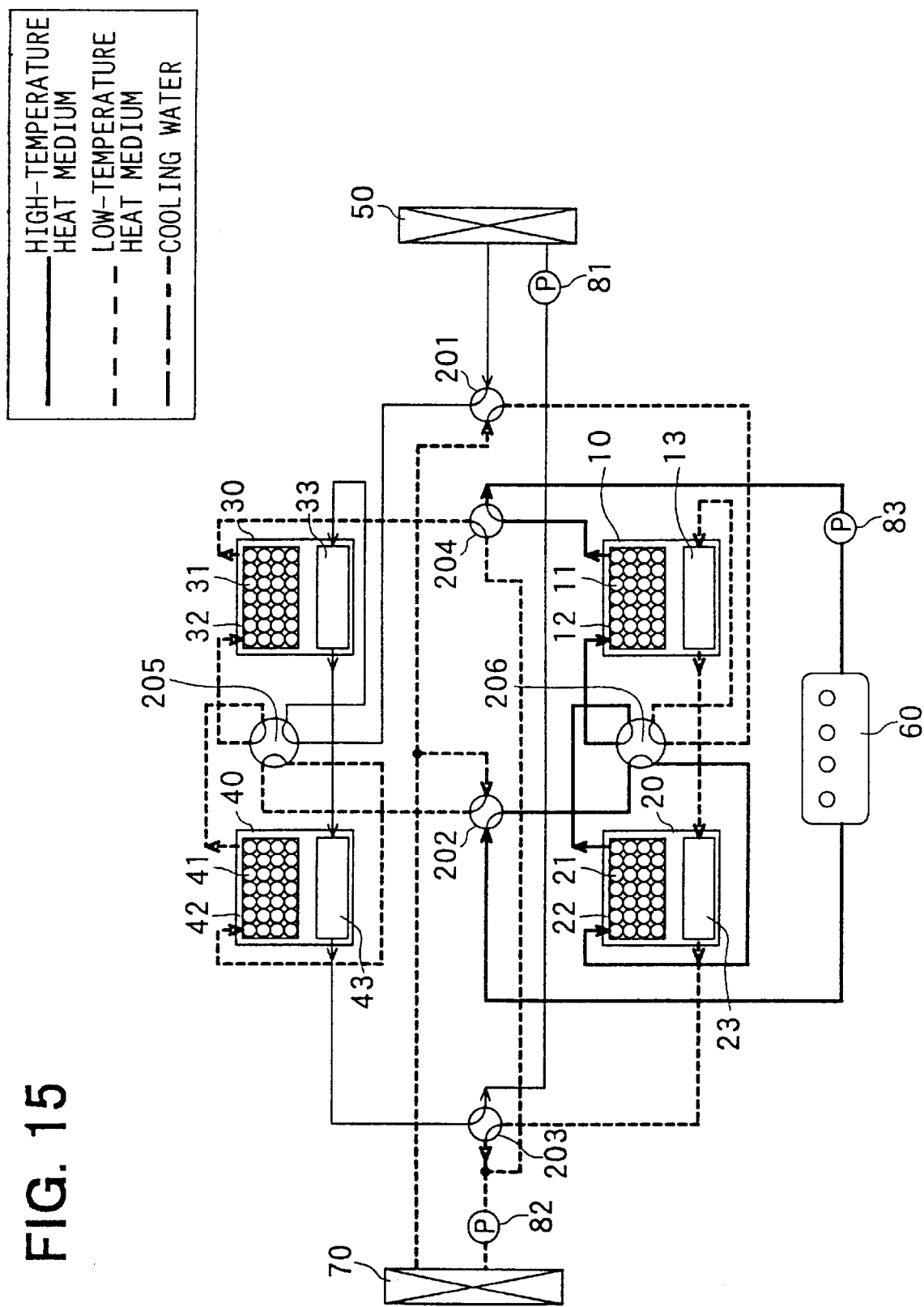
FIG. 15 is a schematic view showing a fourth state of the adsorption-type cooling apparatus of Embodiment 6 of the present invention.
Figure 16:
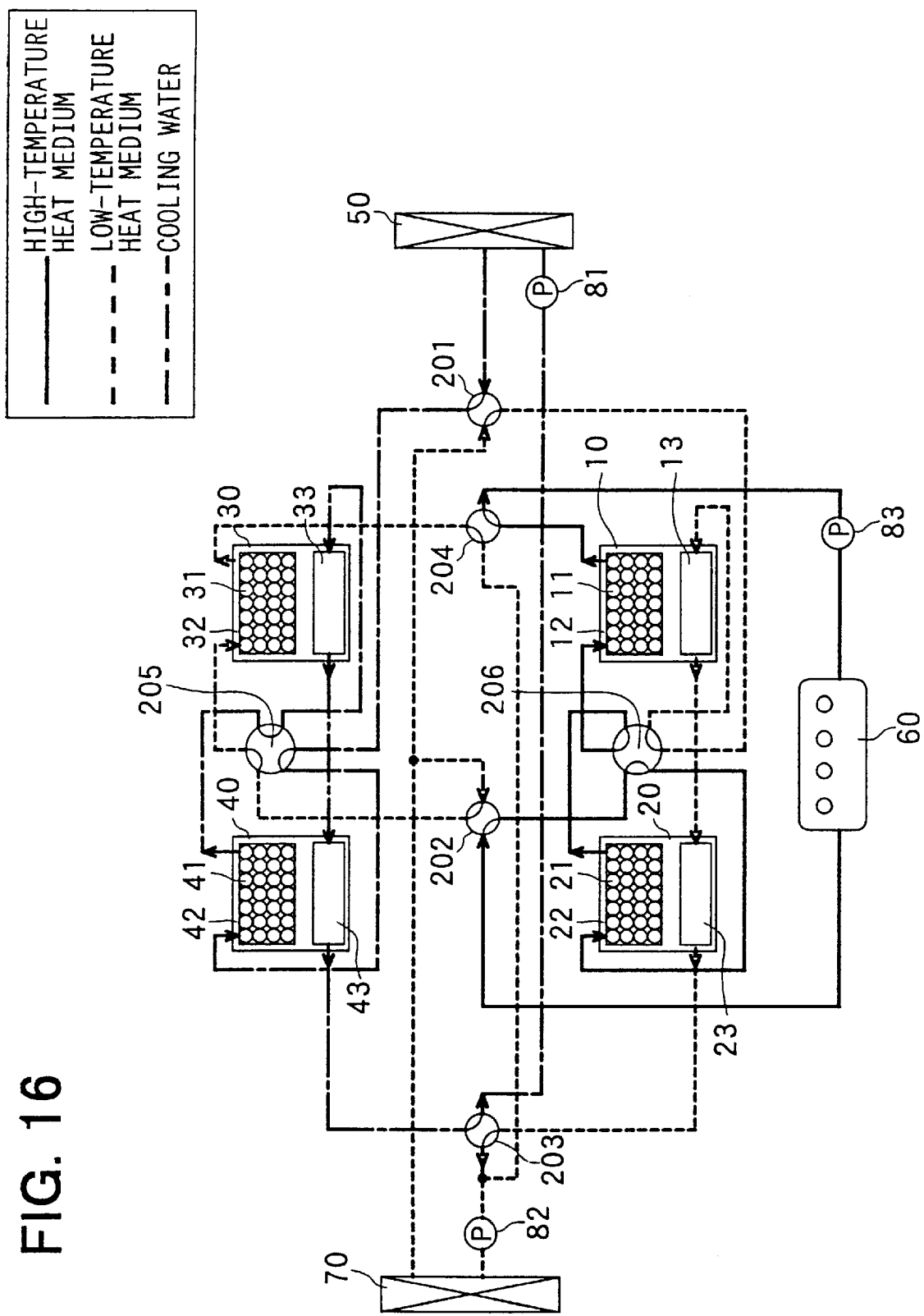
FIG. 16 is a schematic view showing a fifth state of the adsorption-type cooling apparatus of Embodiment 6 of the present invention.
Figure 17:
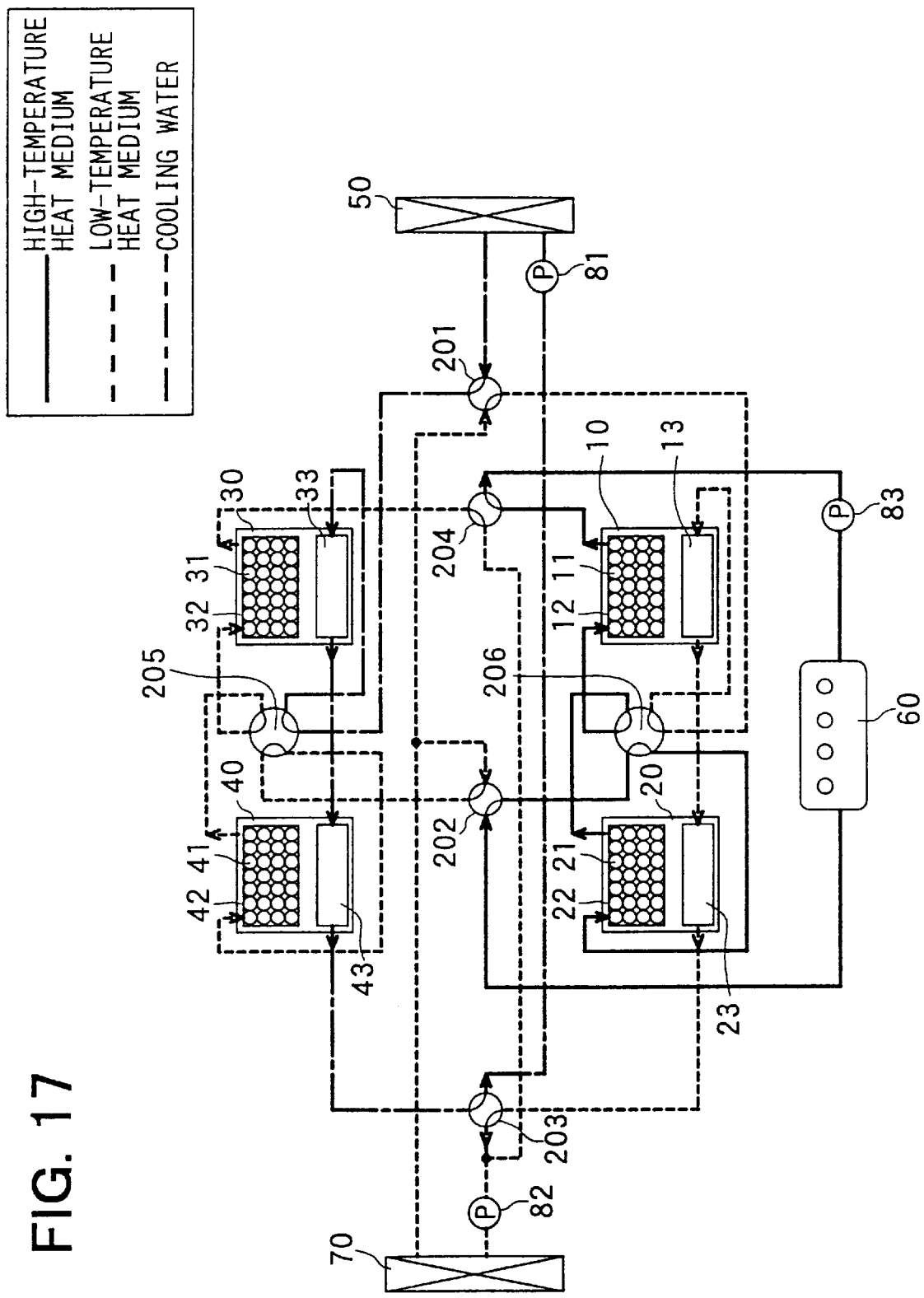
FIG. 17 is a schematic view showing a sixth state of the adsorption-type cooling apparatus of Embodiment 6 of the present invention.
Figure 18:
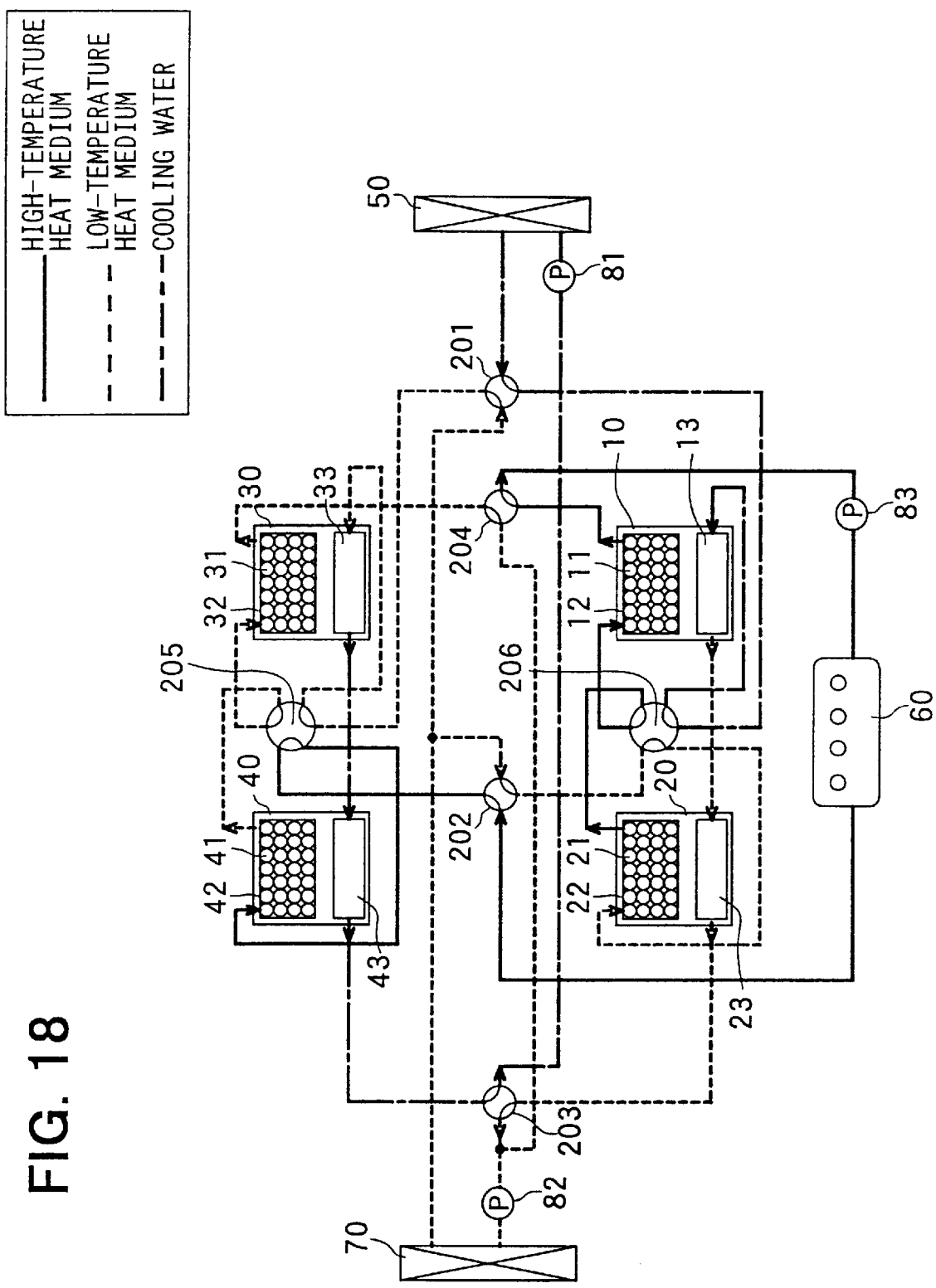
FIG. 18 is a schematic view showing a seventh state of the adsorption-type cooling apparatus of Embodiment 6 of the present invention.
Figure 19:
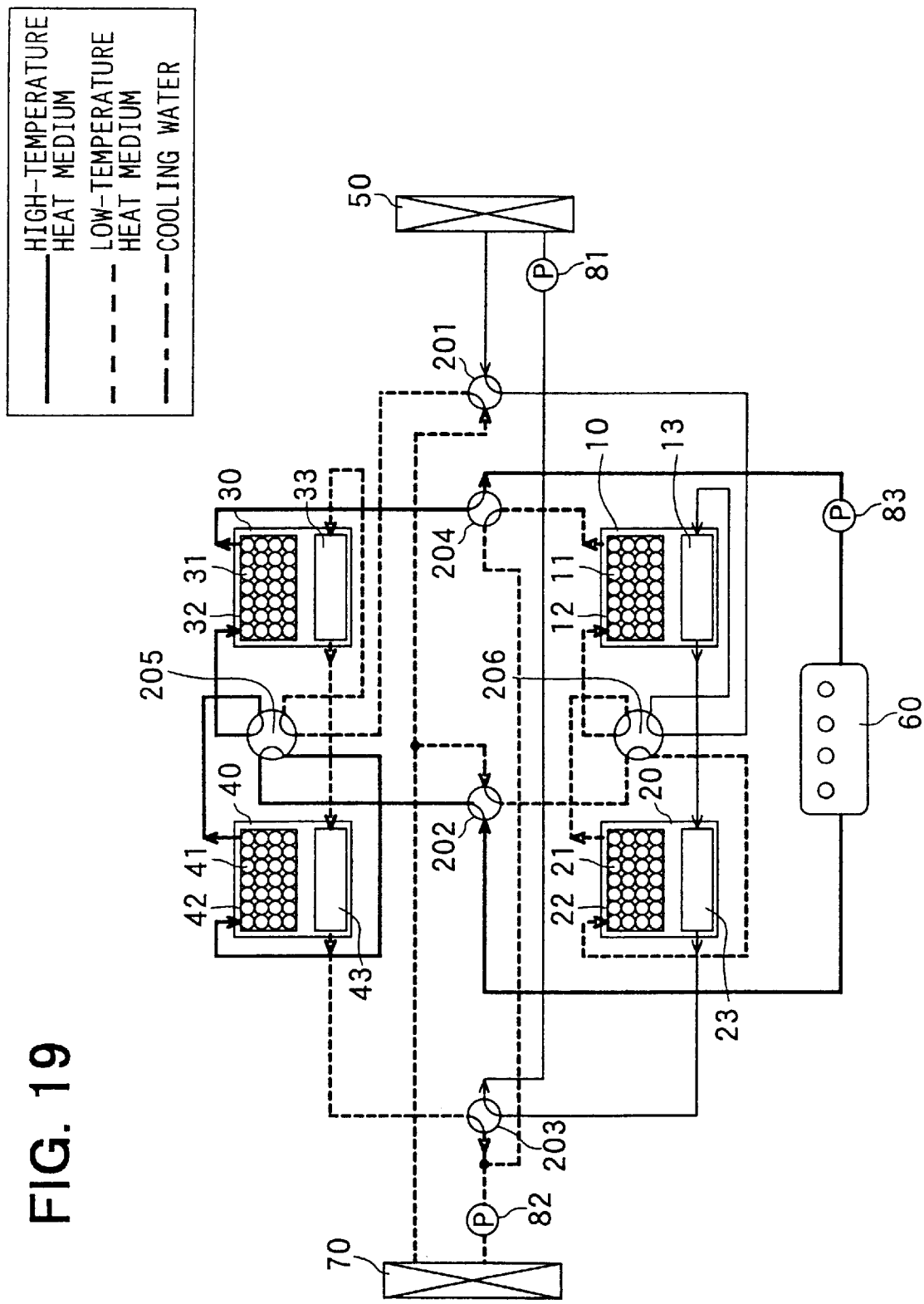
FIG. 19 is a schematic view showing an eighth state of the adsorption-type cooling apparatus of Embodiment 6 of the present invention.
Figure 20:
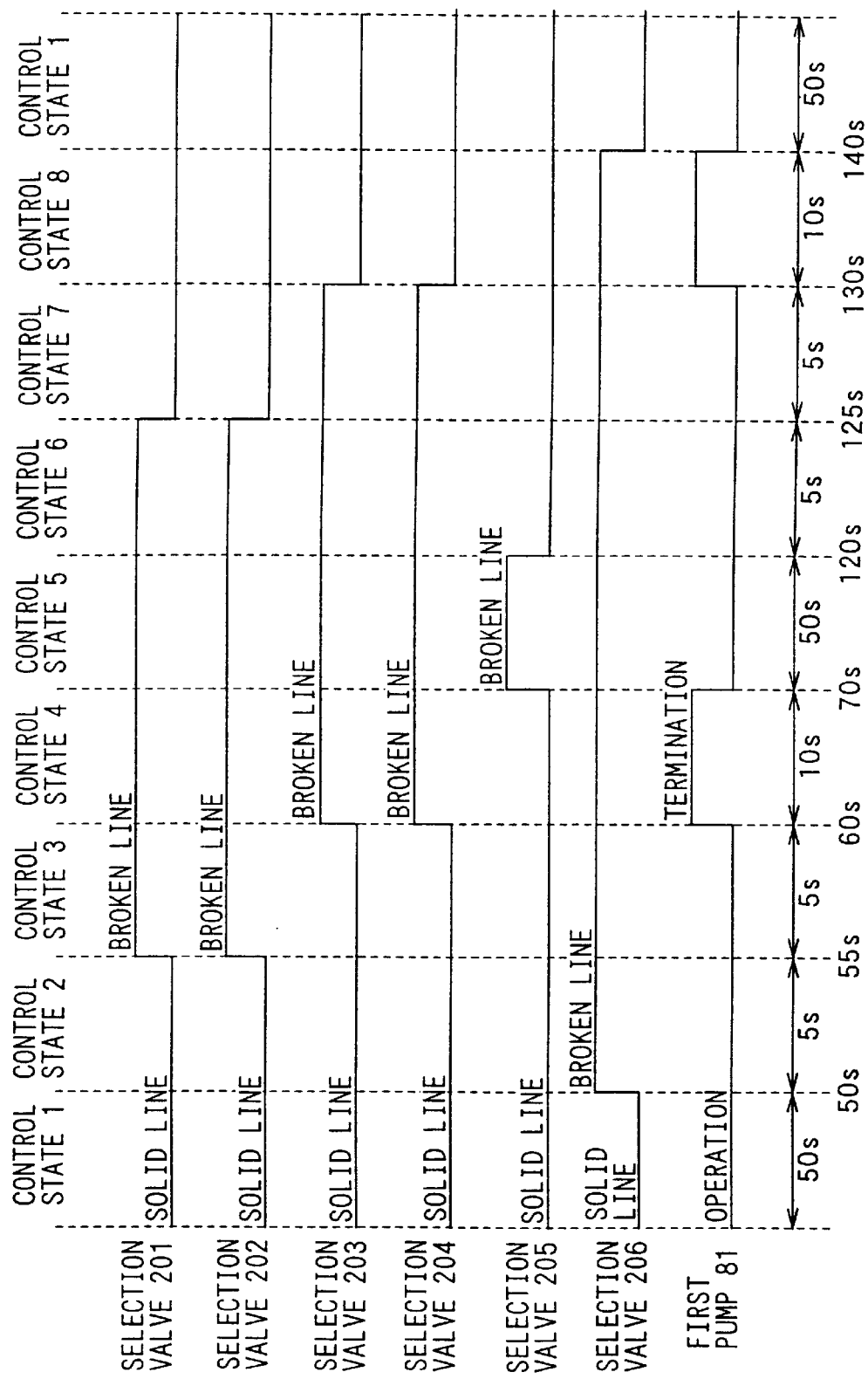
FIG. 20 is a graphical view showing the operation of the selector valves and first pump of the adsorption-type cooling apparatus of Embodiment 6 of according to the present invention.

FIG. 12 is a schematic view illustrating the first state (I), FIG. 13 is a schematic view illustrating the second state (II), FIG. 14 is a schematic view illustrating the third state (III), FIG. 15 is a schematic view illustrating the fourth state (IV), FIG. 16 is a schematic view illustrating the fifth state (V), FIG. 17 is a schematic view illustrating the sixth state (VI), FIG. 18 is a schematic view illustrating the seventh state (VII), FIG. 19 is a schematic view illustrating the eighth state (VIII), FIG. 20 is a time chart illustrating the operation of valves 201–206 and first pump 81.

Embodiment 7

In this embodiment, when the valves 201–206 are switched according to the operation time charts of valves 201–206 and first–third pumps 81–83, which are shown in FIG. 21, the pumps circulating heating medium to the activated valves are stopped only within the prescribed time periods before and after the switching time.

Figure 22A:
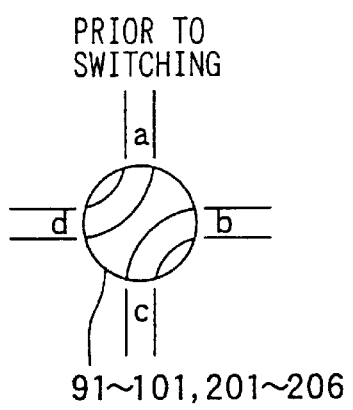
FIG. 22 is a schematic view showing the operation of the selector valves and pumps of the adsorption-type cooling apparatus of the present invention.
Figure 22B:
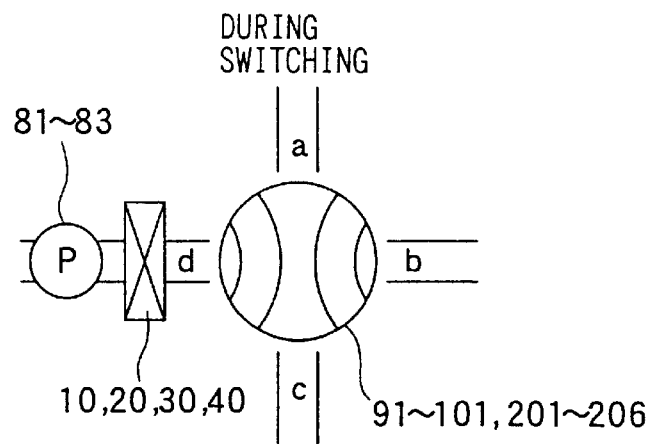
Figure 22C:
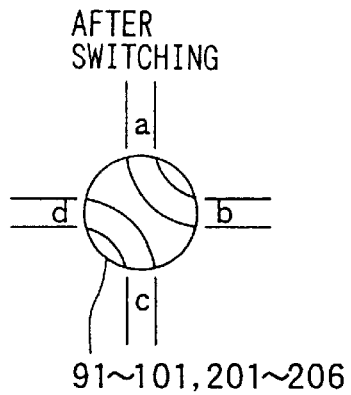

When the valves 201–206 are switched, the valves 201–206 instantaneously get into an entirely closed state, as shown in FIG. 22. Therefore, there is a possibility that a strong force generating an abnormal noise will act upon the valves 201–206 due to a water impact (water hammer) acting upon the valves 201–206. Furthermore, in FIG. 22, a four-way valve is presented, but this figure is an example which does not indicate that only the four-way valve can be used.

In this regard, in the present embodiment, the pumps circulating heating medium to the valves, which are switched, are stopped. Therefore, the effect of a strong force created by the water impact (water hammer) on valves 201–206 is prevented.

Furthermore, in FIG. 21, this embodiment was explained by referring to an adsorption-type cooling apparatus of Embodiment 6. However, the present invention is not limited thereto and can be applied to the adsorption-type cooling apparatus, for example, of Embodiment 1.

Embodiment 8

In this embodiment, a check valve 207 is installed in the apparatus of Embodiment 7 inside heating medium channel through which heating medium flows, in a position in which heating medium flows in one direction only. Furthermore, in FIG. 23, a four-way valve is presented. However, this figure is an example which does not indicate that only the four-way valve can be used.

Incidentally, in Embodiment 7, the pumps 81–83 are stopped when the valves 201–206 are switched. Therefore, heating medium pushed in by the pump pressure may flow backward when the pumps 81–83 are stopped. If heating medium flows backward, the replacement of heat medium is difficult to conduct quickly and accurately. Therefore, the capacity of the adsorption-type cooling apparatus may be decreased.

In this regard, because this embodiment employs the check valve 207, even if the pumps 81–83 are stopped when the selector valves 201–206 are switched, heating medium that was pushed in by the pump pressure is prevented from flowing backward. Therefore, the replacement of heat medium can be conducted quickly and accurately. As a result, the adsorption-type cooling apparatus can demonstrate its capacity in full.

Figure 23:
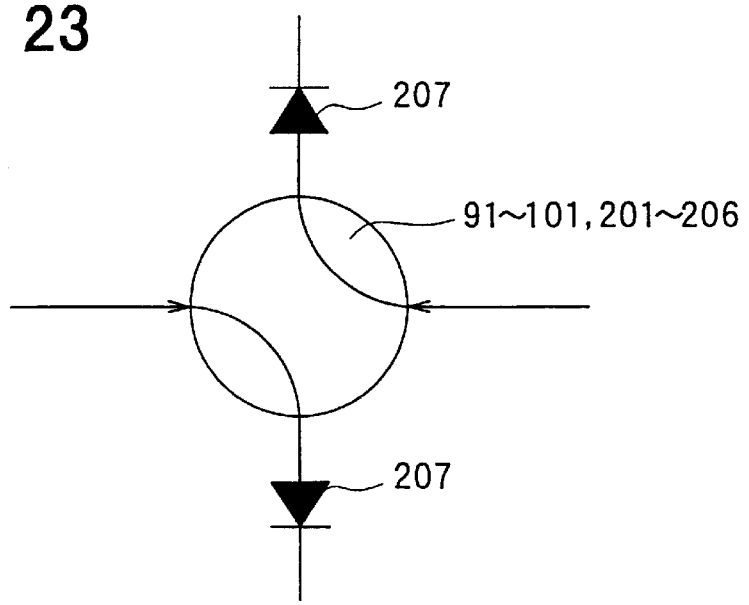
FIG. 23 is a schematic view showing the check valve installed in the adsorption-type cooling apparatus of Embodiment 8 of the present invention.

Furthermore, in FIG. 23, the check valve 207 was installed in the exit side of the selector valve. However, the present embodiment is not limited to this configuration, and the check valve can be in any position inside heating medium channel through which heating medium flows, provided that this is a position in which heating medium flows in one direction only.

Other Embodiments

In the above-described embodiments, the present invention was applied to an air conditioner for vehicles. However, the present invention is not limited to this application and can be applied to other cooling apparatus.

Furthermore, a silica gel was used as the adsorbent, but active alumina, active carbon, zeolites, molecular sieving carbon and the like may also be used.

While the above-described embodiments refer to examples of usage of the present invention, it is understood that the present invention may be applied to other usage, modifications and variations of the same, and is not limited to the disclosure provided herein.

While the above-described embodiments refer to examples of usage of the present invention, it is understood that the present invention may be applied to other usage, modifications and variations of the same, and is not limited to the disclosure provided herein.

What is claimed is:

1. An adsorption-type cooling apparatus comprising:
   first, second, third, and fourth adsorption devices, each of said first, second, third, and fourth adsorption devices are filled with a coolant and contain an adsorbent which adsorbs evaporated coolant and desorbs adsorbed coolant during heating, each of said first, second, third, and fourth adsorption devices having an adsorption core, each said adsorption core providing heat exchange between a respective said adsorbent and a heating medium;
   evaporation and condensation cores providing heat exchange between a heating medium and the coolant;
   a cooling device in which heating medium cooled in said evaporation and condensation cores circulates and cools an object of cooling;
   heating means supplying a high-temperature heat medium to said first, second, third and fourth adsorption devices;
   cooling means supplying a low-temperature heat medium which has a temperature lower than that of said high-temperature heat medium to said first, second, third and fourth adsorption devices;
   switching control means which switches between:
   a first state where a heating medium is circulated between said cooling device and evaporation and condensation cores of said first and second adsorption devices, said low-temperature heat medium is circulated to said adsorption core of said first adsorption device, heating medium exiting said cooling device is circulated to said adsorption core of said second adsorption device while said high-temperature heat medium is circulated to said adsorption cores of said third and fourth adsorption devices and said low-temperature heat medium is circulated to the evaporation and condensation cores of said third and fourth adsorption devices;
   a second state in which a heat medium is circulated between said cooling device and evaporation and condensation cores of said first and second adsorption devices, said low-temperature heat medium is circulated to said adsorption cores of said first and second adsorption devices while said high-temperature heat medium is circulated to said adsorption cores of said third and fourth adsorption devices and said low-temperature heat medium is circulated to the evaporation and condensation cores of said third and fourth adsorption devices;
   a third state in which said low-temperature heat medium is supplied to the inlet openings of evaporation and condensation cores of said first and second adsorption devices and said high-temperature heat medium is supplied to inlet openings of said adsorption cores of said first and second adsorption devices while said low-temperature heat medium is supplied to the inlet openings of said adsorption cores of said third and fourth adsorption devices and heating medium exiting said cooling device is supplied to the evaporation and condensation cores of said third and fourth adsorption devices;
   a fourth state where said low-temperature heat medium is circulated to the evaporation and condensation cores of said first and second adsorption devices and said high-temperature heat medium is circulated to said adsorption cores of said first and second adsorption devices while said low-temperature heat medium is circulated to said adsorption cores of said third and fourth adsorption devices, wherein the circulation of this heat medium is terminated when said evaporation and condensation cores of said third and fourth adsorption devices were filled with heating medium exiting said cooling device;
   a fifth state where a heat medium is circulated between said cooling device and evaporation and condensation cores of said third and fourth adsorption devices, said low-temperature heat medium is circulated to said adsorption core of said third adsorption device and heating medium exiting said cooling device is circulated to said adsorption core of said fourth adsorption device, wherein while said high-temperature heat medium is circulated to said adsorption cores of said first and second adsorption devices and said low-temperature heat medium is circulated to the evaporation and condensation cores of said first and second adsorption devices;
   a sixth state in which a heat medium is circulated between said cooling device and evaporation and condensation cores of said third and fourth adsorption devices and said low-temperature heat medium is circulated to said adsorption cores of said third and fourth adsorption device while said high-temperature heat medium is circulated to said adsorption cores of said first and second adsorption devices and said low-temperature heat medium is circulated to the evaporation and condensation cores of said first and second adsorption devices;
   a seventh state in which said low-temperature heat medium is supplied to evaporation and condensation cores of said third and fourth adsorption devices and said high-temperature heat medium is supplied to the inlet openings of adsorption cores of said third and fourth adsorption device while said low-temperature heat medium is supplied to the inlet openings of said adsorption cores of said first and second adsorption devices and heating medium exiting said cooling device is supplied to the evaporation and condensation cores of said first and second adsorption devices; and an eighth state in which said low-temperature heat medium is circulated to the evaporation and condensation cores of said third and fourth adsorption devices and said high-temperature heat medium is circulated to said adsorption cores of said third and fourth adsorption device while said low-temperature heat medium is circulated to said adsorption cores of said first and second adsorption devices, wherein the circulation of this heat medium is terminated when the evaporation and condensation cores of said first and second adsorption devices were filled with heating medium exiting said cooling device; and wherein said switching control means has a first switching control pattern in which the states are switched in an order of the first state, second state, third state, fourth state, fifth state, sixth state, seventh state, eighth state, first state.

2. The adsorption-type cooling apparatus according to claim 1, wherein said switching control means has a second switching control pattern in which the states are switched in the order of fourth state, seventh state, eighth state, third state, fourth state.

3. The adsorption-type cooling apparatus according to claim 1, wherein said switching control means has a third switching control pattern in which the states are switched in an order of the first state, third state, fourth state, fifth state, seventh state, eighth state, first state, when the operation time of said first and fifth states is extended.

4. The adsorption-type cooling apparatus according to claims 1, wherein the flow rate of heating medium supplied to said evaporation and condensation cores in said third state or said seventh state is greater than the flow rate of heating medium supplied to said evaporation and condensation cores in said first state or said fifth state.

5. The adsorption-type cooling apparatus according to claim 1, wherein said switching control means controls heating medium flow by controlling valves disposed along a flow of said heating medium and by switching heating medium and flow pumps circulating heating medium flow, and when said valves are switched, said switching control means controls said pumps to terminate the circulation of heating medium to the switched valves.

6. The adsorption-type cooling apparatus according to claim 5, wherein a check valve is installed inside heating medium channel through which heating medium flows, in a position in which heating medium flows in one direction only.

* * * * *